(12) United States Patent
Beedgen et al.

(10) Patent No.: US 11,615,075 B2
(45) Date of Patent: *Mar. 28, 2023

(54) LOGS TO METRICS SYNTHESIS

(71) Applicant: Sumo Logic, Inc., Redwood City, CA (US)

(72) Inventors: Christian Friedrich Beedgen, San Carlos, CA (US); David M. Andrzejewski, San Francisco, CA (US); Benjamin Everette Newton, Belmont, CA (US); Kumar Avijit, Fremont, CA (US); Stefan Christoph Zier, San Jose, CA (US)

(73) Assignee: Sumo Logic, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,579

(22) Filed: Dec. 3, 2020

(65) Prior Publication Data

US 2021/0089518 A1  Mar. 25, 2021

Related U.S. Application Data

(63) Continuation of application No. 16/031,754, filed on Jul. 10, 2018, now Pat. No. 11,042,534.

(Continued)

(51) Int. Cl.
*G06F 7/00* (2006.01)
*G06F 17/00* (2019.01)
(Continued)

(52) U.S. Cl.
CPC ...... *G06F 16/2379* (2019.01); *G06F 16/2228* (2019.01); *G06F 16/24* (2019.01); *G06F 16/258* (2019.01)

(58) Field of Classification Search
None
See application file for complete search history.

(56) References Cited

U.S. PATENT DOCUMENTS 6,470,384 B1  10/2002  O'Brien
6,594,634 B1   7/2003  Hampton
(Continued)

FOREIGN PATENT DOCUMENTS

WO  WO-2019/099065 A1  5/2019
WO  WO-2019/099558 A1  5/2019

OTHER PUBLICATIONS

"U.S. Appl. No. 16/031,738, Examiner Interview Summary dated May 21, 2020", 3 pgs.
(Continued)

*Primary Examiner* — Tuan A Pham
(74) *Attorney, Agent, or Firm* — Schwegman Lundberg & Woessner, P.A.

(57) ABSTRACT

Logs to metrics synthesis includes receiving a log message. It further includes translating the log message into a metrics data point comprising a timestamp, a metric name, a metric value, and a set of metadata key-value pairs. It further includes determining a time series in which to insert the metrics data point into which the log message was translated. It further includes inserting the metrics data point into the determined time series. It further includes updating a metadata catalog based at least in part on the metrics data point.

18 Claims, 15 Drawing Sheets

Related U.S. Application Data

(60) Provisional application No. 62/586,754, filed on Nov. 15, 2017, provisional application No. 62/686,587, filed on Jun. 18, 2018.

(51) Int. Cl.
  *G06F 16/23* (2019.01)
  *G06F 16/22* (2019.01)
  *G06F 16/24* (2019.01)
  *G06F 16/25* (2019.01)

(56) References Cited

U.S. PATENT DOCUMENTS

| | | |
|---|---|---|
| 6,851,087 B1 | 2/2005 | Sibert |
| 7,716,022 B1 | 5/2010 | Park et al. |
| 8,219,574 B2 | 7/2012 | Liu |
| 8,724,487 B1 | 5/2014 | Aitken |
| 8,806,361 B1 | 8/2014 | Noel |
| 8,990,184 B2 | 3/2015 | Baum |
| 9,002,854 B2 | 4/2015 | Baum |
| 9,275,093 B2 | 3/2016 | Pandey |
| 9,459,942 B2 | 10/2016 | Dagan |
| 9,516,052 B1 | 12/2016 | Chauhan |
| 9,646,029 B1 | 5/2017 | Baird, III |
| 9,990,184 B2 | 6/2018 | Shukla et al. |
| 10,387,475 B2 | 8/2019 | Bhave |
| 10,409,568 B2 | 9/2019 | Raman et al. |
| 10,552,443 B1 | 2/2020 | Wu |
| 10,628,079 B1 | 4/2020 | Li et al. |
| 11,011,255 B1 | 5/2021 | Kim et al. |
| 11,042,534 B2 | 6/2021 | Beedgen et al. |
| 11,182,434 B2 | 11/2021 | Beedgen et al. |
| 11,481,383 B2 | 10/2022 | Beedgen et al. |
| 2004/0088406 A1 | 5/2004 | Corley et al. |
| 2004/0258082 A1 | 12/2004 | Morisaki |
| 2011/0153603 A1 | 6/2011 | Adiba |
| 2011/0218978 A1 | 9/2011 | Hong |
| 2012/0117079 A1 | 5/2012 | Baum |
| 2014/0045436 A1 | 2/2014 | Gutierrez, Jr. |
| 2014/0122022 A1 | 5/2014 | Chen |
| 2014/0123136 A1 | 5/2014 | Beda |
| 2014/0149466 A1* | 5/2014 | Sato ............... G06F 16/21 707/803 |
| 2014/0324862 A1 | 10/2014 | Bingham |
| 2015/0088959 A1* | 3/2015 | Doddavula ......... H04L 67/02 709/201 |
| 2015/0095381 A1 | 4/2015 | Chen |
| 2015/0213631 A1 | 7/2015 | Vander Broek |
| 2015/0341212 A1* | 11/2015 | Hsiao ............... G06F 3/0482 715/735 |
| 2016/0092485 A1* | 3/2016 | Lamas ............. G06F 16/2291 707/746 |
| 2016/0103665 A1 | 4/2016 | Liu et al. |
| 2016/0125083 A1 | 5/2016 | Dou |
| 2016/0139949 A1 | 5/2016 | Jagannath et al. |
| 2016/0226944 A1 | 8/2016 | Hsiao |
| 2016/0328432 A1 | 11/2016 | Raghunathan |
| 2017/0006135 A1* | 1/2017 | Siebel ................. G06N 20/00 |
| 2017/0048264 A1 | 2/2017 | Chauhan |
| 2017/0139961 A1 | 5/2017 | Baum et al. |
| 2017/0147657 A1 | 5/2017 | Bhave |
| 2018/0024901 A1 | 1/2018 | Tankersley |
| 2018/0069887 A1 | 3/2018 | Chauhan |
| 2018/0089269 A1 | 3/2018 | Pal |
| 2018/0089272 A1 | 3/2018 | Bath |
| 2018/0089290 A1 | 3/2018 | Haggie |
| 2018/0102938 A1* | 4/2018 | Yoon ................... G06F 17/40 |
| 2018/0218269 A1 | 8/2018 | Oliner et al. |
| 2018/0292983 A1 | 10/2018 | Nor et al. |
| 2019/0095491 A1 | 3/2019 | Bhattacharjee |
| 2019/0146960 A1 | 5/2019 | Beedgen et al. |
| 2019/0146967 A1 | 5/2019 | Beedgen et al. |
| 2019/0146978 A1 | 5/2019 | Beedgen et al. |
| 2019/0163678 A1 | 5/2019 | Bath |
| 2019/0243747 A1 | 8/2019 | Ross |
| 2019/0258677 A1 | 8/2019 | Beedgen |
| 2021/0089518 A1 | 3/2021 | Beedgen |
| 2021/0406317 A1 | 12/2021 | Beedgen et al. |
| 2022/0327113 A1 | 10/2022 | Beedgen et al. |
| 2022/0398243 A1 | 12/2022 | Beedgen et al. |

OTHER PUBLICATIONS

"U.S. Appl. No. 16/031,738, Examiner Interview Summary dated Jun. 30, 2021", 3 pgs.
"U.S. Appl. No. 16/031,738, Examiner Interview Summary dated Sep. 22, 2020", 3 pgs.
"U.S. Appl. No. 16/031,738, Examiner Interview Summary dated Dec. 21, 2020", 3 pgs.
"U.S. Appl. No. 16/031,738, Final Office Action dated Apr. 2, 2021", 26 pgs.
"U.S. Appl. No. 16/031,738, Final Office Action dated Jun. 19, 2020", 34 pgs.
"U.S. Appl. No. 16/031,738, Non Final Office Action dated Feb. 20, 2020", 36 pgs.
"U.S. Appl. No. 16/031,738, Non Final Office Action dated Jul. 28, 2021", 26 pgs.
"U.S. Appl. No. 16/031,738, Non Final Office Action dated Sep. 30, 2020", 36 pgs.
"U.S. Appl. No. 16/031,738, Response filed May 15, 2020 to Non Final Office Action dated Feb. 20, 2020", 7 pgs.
"U.S. Appl. No. 16/031,738, Response filed Jul. 1, 2021 to Final Office Action dated Apr. 2, 2021", 10 pgs.
"U.S. Appl. No. 16/031,738, Response filed Sep. 16, 2020 to Final Office Action dated Jun. 19, 2020", 9 pgs.
"U.S. Appl. No. 16/031,738, Response filed Dec. 14, 2020 to Non Final Office Action dated Sep. 30, 2020", 9 pgs.
"U.S. Appl. No. 16/031,749, Examiner Interview Summary dated Jun. 16, 2020", 3 pgs.
"U.S. Appl. No. 16/031,749, Examiner Interview Summary dated Dec. 24, 2020", 2 pgs.
"U.S. Appl. No. 16/031,749, Final Office Action dated Sep. 15, 2020", 17 pgs.
"U.S. Appl. No. 16/031,749, Non Final Office Action dated Mar. 11, 2020", 15 pgs.
"U.S. Appl. No. 16/031,749, Non Final Office Action dated Aug. 18, 2021", 18 pgs.
"U.S. Appl. No. 16/031,749, Response filed Jun. 10, 2020 to Non Final Office Action dated Mar. 11, 2020", 8 pgs.
"U.S. Appl. No. 16/031,749, Response filed Dec. 10, 2020 to Final Office Action dated Sep. 15, 2020", 8 pgs.
"U.S. Appl. No. 16/031,754, Corrected Notice of Allowability dated May 25, 2021", 3 pgs.
"U.S. Appl. No. 16/031,754, Examiner Interview Summary dated Jul. 9, 2020", 3 pgs.
"U.S. Appl. No. 16/031,754, Non Final Office Action dated Mar. 31, 2020", 14 pgs.
"U.S. Appl. No. 16/031,754, Notice of Allowance dated Jan. 21, 2021", 11 pgs.
"U.S. Appl. No. 16/031,754, Notice of Allowance dated Sep. 29, 2020", 17 pgs.
"U.S. Appl. No. 16/031,754, Response filed Jun. 30, 2020 to Non Final Office Action dated Mar. 31, 2020", 8 pgs.
"U.S. Appl. No. 16/189,571, Examiner Interview Summary dated Aug. 14, 2020", 3 pgs.
"U.S. Appl. No. 16/189,571, Final Office Action dated Oct. 21, 2020", 18 pgs.
"U.S. Appl. No. 16/189,571, Non Final Office Action dated May 21, 2020", 15 pgs.
"U.S. Appl. No. 16/189,571, Notice of Allowance dated Jul. 28, 2021", 13 pgs.
"U.S. Appl. No. 16/189,571, Response filed Feb. 19, 2021 to Final Office Action dated Oct. 21, 2020", 7 pgs.
"U.S. Appl. No. 16/189,571, Response filed Aug. 12, 2020 to Non Final Office Action dated May 21, 2020", 6 pgs.

(56) References Cited

OTHER PUBLICATIONS

"International Application Serial No. PCT/US2018/041635, International Preliminary Report on Patentability dated May 28, 2020", 7 pgs.

"International Application Serial No. PCT/US2018/041635, International Search Report dated Nov. 20, 2018", 4 pgs.

"International Application Serial No. PCT/US2018/041635, Written Opinion dated Nov. 20, 2018", 5 pgs.

"International Application Serial No. PCT/US2018/061107, International Preliminary Report on Patentability dated May 28, 2020", 7 pgs.

"International Application Serial No. PCT/US2018/061107, International Search Report dated Jan. 24, 2019", 2 pgs.

"International Application Serial No. PCT/US2018/061107, Written Opinion dated Jan. 24, 2019", 5 pgs.

"Israeli Application Serial No. 279019, Notice of Insufficiencies dated Dec. 8, 2020", w/Concise Statement of Relevance), 3 pgs.

"Israeli Application Serial No. 279019, Response filed Jan. 20, 2021 to Notice of Insufficiencies dated Dec. 8, 2020", (w/ Concise Statement of Relevance), 3 pgs.

Dmitry, Namiot, "Time Series Databases", Lomonosov Moscow State University, (2015), 7 pgs.

Dmitry Namiot, Time Series Database, Proceedings of the XVII International Conference <<Data Analytics and Management in Data Intensive Domains>>, 2015, pp. 132-137.

David Carasso, Exploring Splunk, Apr. 2012, Splunk.

"U.S. Appl. No. 16/031,738, Response filed May 17, 2022 to Final Office Action dated Feb. 18, 2022", 12 pgs.

"U.S. Appl. No. 16/031,738, Notice of Allowance dated Jun. 23, 2022", 11 pgs.

"U.S. Appl. No. 16/031,738, Final Office Action dated Feb. 18, 2022", 32 pgs.

"U.S. Appl. No. 16/031,738, Response filed Oct. 21, 2021 to Non-Final Office Action dated Jul. 28, 2021", 12 pgs.

"U.S. Appl. No. 16/031,749, Notice of Allowance dated Mar. 23, 2022", 9 pgs.

"U.S. Appl. No. 16/031,749, Response filed Nov. 4, 2021 to Non-Final Office Action dated Aug. 18, 2021", 13 pgs.

"U.S. Appl. No. 17/459,015, Non Final Office Action dated Sep. 2, 2022", 24 pgs.

"U.S. Appl. No. 17/459,015, Response filed Dec. 1, 2022 to Non Final Office Action dated Sep. 2, 2022", 15 pgs.

\* cited by examiner

LOGS TO METRICS SYNTHESIS

CROSS REFERENCE TO OTHER APPLICATIONS

This application is a continuation of U.S. patent application Ser. No. 16/031,754, entitled LOGS TO METRICS SYNTHESIS filed Jul. 10, 2018 which is incorporated herein by reference for all purposes, which claims priority to U.S. Provisional Application No. 62/586,754, entitled LOGS TO METRICS SYNTHESIS filed Nov. 15, 2017 which is incorporated herein by reference for all purposes, and claims priority to U.S. Provisional Application No. 62/686,587, entitled LOGS TO METRICS SYNTHESIS filed Jun. 18, 2018 which is incorporated herein by reference for all purposes.

BACKGROUND OF THE INVENTION

Telemetry delivered as logs can in many cases be analyzed by a logging solution, but it is often cumbersome, and expensive, which means results are not returned as fast as otherwise possible. It is cumbersome because for each metrics related question a user wants an answer for, they first have to not only search for the logs containing the relevant telemetry, but also need to manually parse the telemetry logs into the pieces that make up a metric. Doing this at query time is also expensive, as the data needs to be parsed and transformed over and over again. Because of the cost of this, results will take longer to compute, wasting the user's time.

BRIEF DESCRIPTION OF THE DRAWINGS

Various embodiments of the invention are disclosed in the following detailed description and the accompanying drawings.

DETAILED DESCRIPTION

Figure 1:
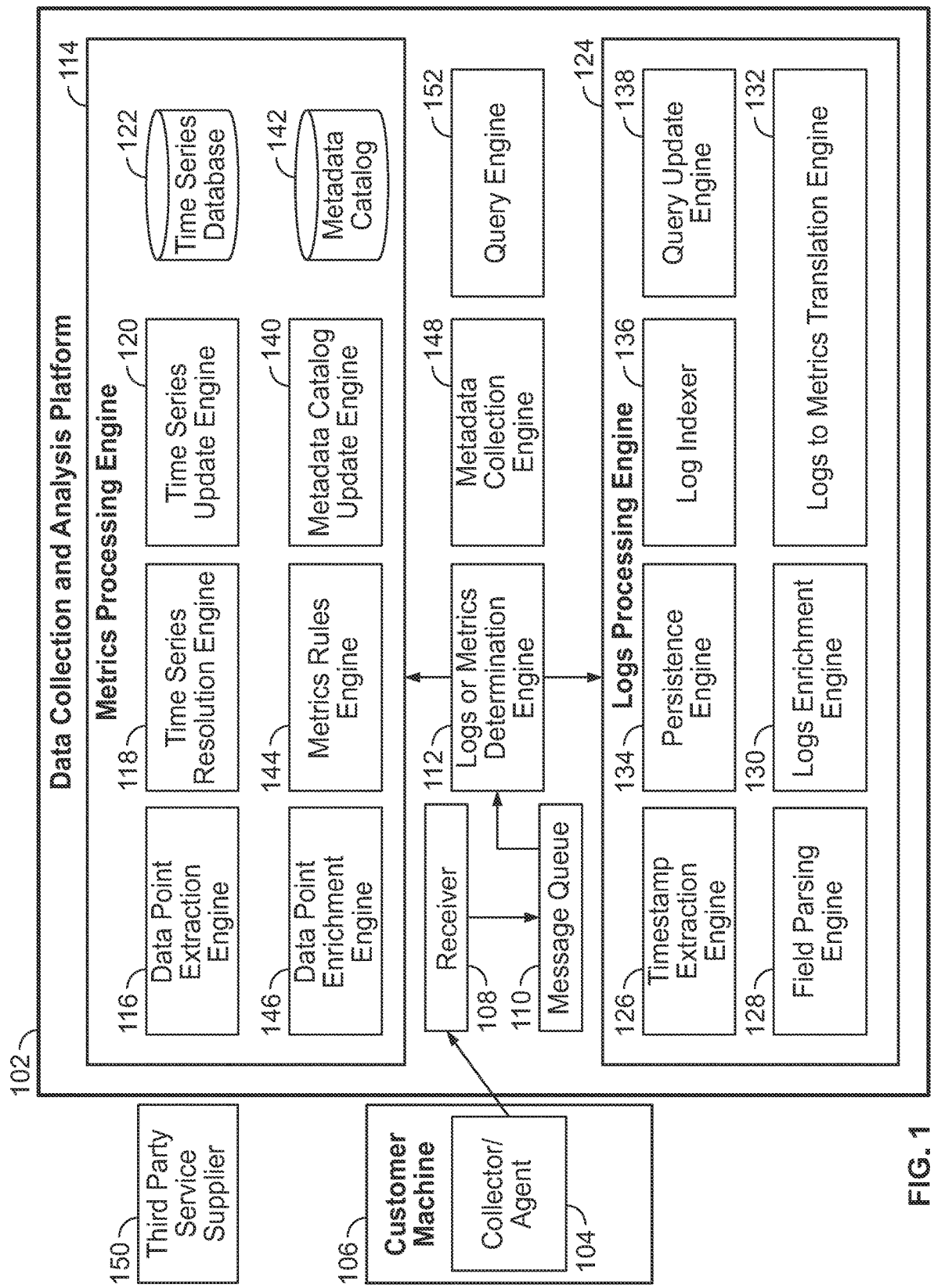
FIG. 1 illustrates an embodiment of an environment in which machine data collection and analysis is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In existing systems, answering metrics-related questions at query time about telemetry that is delivered in the form of logs is expensive, as log data containing telemetry needs to be repeatedly parsed and transformed, making such queries costly. For example, because the telemetry has to be extracted from logs over and over at query time, it is very challenging to optimize for long range queries by creating rollups with lower time granularity (e.g., 1 year at a roll-up of 1 day).

Using the techniques described herein, such problems are solved by transforming telemetry into metrics time series. Without rolling up, the time to answer the query based on logs is linear to the covered time range. With roll-ups, while the query time is still technically linear to the time range queried, there is much less information to process, making the query time much smaller. This also applies to dimensional rollups as well. An advantage of transforming telemetry into metrics time series and performing roll ups is that pulling the structuring of the data forward in time (i.e., transforming telemetry into metrics time series early in the processing of logs) allows other structure-dependent pre-computation/processing to occur.

FIG. 1 illustrates an embodiment of an environment in which machine data collection and analysis is performed.

Ingestion Time Processing

In this example, data collection and analysis platform 102 (also referred to herein as the "platform" or the "system") is configured to ingest and analyze machine data (e.g., log messages and metrics) collected from customers (e.g., entities utilizing the services provided by platform 102). For example, collectors (e.g., collector 104 installed on machine 106 of a customer) send log messages to the platform over a network (such as the Internet, a local network, or any other type of network, as appropriate); customers may also send logs directly to an endpoint such as a common HTTPS endpoint. Collectors can also send metrics, and likewise, metrics can be sent in common formats to the HTTPS endpoint directly. As used herein, log messages and metrics are but two examples of machine data that may be ingested and analyzed by platform 102 using the techniques described herein. In this example, machine 106 has installed a collector agent software 104 that is configured to collect machine data from one or more sources (which may be collected from machines other than machine 106). Agent 104 may also be configured to interrogate machine 102 directly to gather various host metrics such as CPU (central processing unit) usage, memory utilization, etc.

Customers sometimes may prefer not to use the collector software (e.g., provided by the operator of the platform) but instead send log messages directly to the HTTPS service endpoint; this may be utilized in situations where resources might be too constrained to install the collector software (e.g., mobile phones), or where software installation is not possible (e.g., AWS Lambda).

As shown in this example, machine data such as logs and metrics are received by receiver 108 (e.g., from machine 106 over a network such as the Internet), which, as one example, is implemented as a service receiver cluster. In some embodiments, receiver 108 operates behind a load balancer. In this example, logs are accumulated by each receiver into bigger batches before being sent to message queue 110. In some embodiments, the same batching mechanism applies to incoming metrics data points as well. In some embodiments, once committed to the message queue, the receiver acknowledges the successful receipt of the log messages or metrics data points to the sender. In this example, on the other side of the message queue, a next level of processing is performed on all incoming logs and metrics, further details of which are described below.

As shown in this example, the batches of logs and metrics data points are sent from the message queue to logs or metrics determination engine 112. Logs or metrics determination engine 112 is configured to read batches of items from the message queue and determine whether the next batch of items read from the message queue is a batch of metrics data points or whether the next batch of items read from the message queue is a batch of log messages. In some embodiments, the determination of whether the batch of items is a batch of log messages or metrics is based on the endpoint (e.g., HTTPS endpoints) at which the machine data was received. For example, receiver 108 may coordinate with collector agents such that log messages are sent to one endpoint, while metrics are sent to a different end point at receiver 108 (where the machine data may be received via an Application Programming Interface (API)). As another example, the determination of what machine data is log messages or metrics data points is based on the format and metadata of the machine data that is received. For a collector, there may be different types of sources from which raw machine data is collected, and thus, which source the machine data is coming from is known by the collector. Thus, the backend is also aware of the type of the source of the machine data (which may, for example, be tagged with the source type as metadata). The type of source may be used to determine whether the machine data is logs or metrics. In some embodiments, the endpoints described above are also modeled as collectors with sources. And thus, the machine data is classified as a log message or metrics data point based on which endpoint (also modelled as a type of source) the machine data is received on. Depending on whether a batch of machine data includes log messages or metrics data points, the batch of machine data will be sent to one of two specialized backends, metrics processing engine 114 and logs processing engine 124, which are optimized for processing log messages and metrics data points, respectively.

If the next batch of items read from the message queue is a batch of metrics data points, the next batch of items is passed downstream to metrics processing engine 114, which in one example embodiment, is implemented as a cluster. Metrics processing engine 114 is configured to process metrics data points, including extracting and generating the data points from the received batch of metrics data points (e.g., using data point extraction engine 116). Time series resolution engine 118 is configured to resolve the time series for each data point given data point metadata (e.g., metric name, identifying dimensions). Further details regarding metrics data point metadata are described below. Time series update engine 120 is then configured to add the data points to the time series (stored in this example in time series database 122) in a persistent fashion. Further details regarding such processing of metrics data points are described below.

If logs or metrics determination engine 112 determines that the next batch of items read from the message queue is a batch of log messages, the batch of log messages is passed to logs processing engine 124. Logs processing engine 124 is configured to apply log-specific processing, including timestamp extraction (e.g., using timestamp extraction engine 126) and field parsing using extraction rules (e.g., using field parsing engine 128). Other examples of processing include further augmentation (e.g., using logs enrichment engine 130), which will be described in further detail below.

As described above, in the example of FIG. 1, ingested log messages and metrics data points may be directed to respective log and metrics processing backends that are optimized for processing the respective types of data. However, there are some cases in which information that arrived in the form of a log message would be better processed by the metrics backend than the logs backend. One example of such information is telemetry data, which includes, for example, measurement data that might be recorded by an instrumentation service running on a device. In some embodiments, telemetry data includes a timestamp and a value. The telemetry data represents a process in a system. The value relates to a numerical property of the process in question. For example, a smart thermostat in a house has a temperature sensor that measures the temperature in a room on a periodic basis (e.g., every second). The temperature measurement process therefore creates a timestamp-value pair every second, representing the measured temperature of that second. As another example, in a race car such as a Formula 1 car, there would be a large volume of telemetry such as the RPM (revolutions per minute) each second, various engine specific telemetry such as fuel injection timings, etc. As yet another example, in a webserver log, the response time for each request is included, along with the timestamp of the arrival of the request—this is another example of telemetry data, that is used to determine response time quality of service properties of the webserver process.

While telemetry delivered as logs could, in some cases, be analyzed by a logging solution, it would be cumbersome, and expensive, which means results are not returned as fast as otherwise possible. It is cumbersome because for each metrics related question a user wants an answer for, they first have to not only search for the logs containing the relevant telemetry, but also need to manually parse the telemetry logs into the pieces that make up a metric, such as timestamp, value, metadata, etc. Doing this at query time is also expensive for a data processing system, as the data needs to be parsed and transformed over and over again. Because of the cost of this, results will take longer to compute, wasting the user's time.

Telemetry may be more efficiently stored in and queried from a metrics time series store (e.g., using metrics backend 114) than by abusing a generic log message store (e.g., provided by logs backend 124). By doing so, customers utilizing data collection and analysis platform 102 can collect host metrics such as CPU usage directly using, for example, a metrics collector. In this case, the collected telemetry is directly fed into the optimized metrics time series store (e.g., provided by metrics processing engine 114). The system can also at the collector level interpret a protocol such as the common Graphite protocol, and send it directly to the metrics time series storage backend.

However, as described above, there are many scenarios in which what is telemetry is being sent to the data collection and analysis platform in the form of log messages (in which case it would typically be directed to the log backend rather than be directed to a metrics backend). Described herein are techniques that allow telemetry data to continue to be sent in the form of log messages, while at the same time gaining the benefits of the optimized time series store of metrics processing engine backend 114 for handling metrics when appropriate.

The example response time measurement in web server logs described above is one such example in which telemetry data is sent in the form of logs, where the techniques described herein may be used to take the telemetry data and determine response time quality of service properties of the webserver process.

As another example, consider a security context, in which syslog messages may come in the form of CSV (comma separated values). However, storing such CSV values as a log would be inefficient, and it should be stored as a time series in order to better query that information. Using the techniques described herein, although metric data may be received in the form of a CSV text log, the structure of such log messages is automatically detected, and the values from the text of the log (i.e., the numbers between the commas) are stored in a data structure such as columns of a table, which better allows for operations such as aggregations of tables values, or other operations applicable to metrics that may not be relevant to log text. Thus, using the techniques described herein, even metrics disguised in a log message may be represented and stored in the most optimal manner to allow for efficient analysis and querying. Further details regarding what it means for telemetry to be expressed in log messages are described below.

In the example environment of FIG. 1, in order to handle such scenarios in which telemetry data is ingested in the form of logs, platform 102 includes logs to metrics translation engine 132, which is configured to translate log messages that include telemetry data into metrics data points. In some embodiments, translation engine 132 is implemented as a service.

As one example of the process of logs-to-metrics synthesis (further details of which will be described below), translation engine 132 is configured to, for each log message in the batch, consult all existing rules for synthesizing metrics from logs (also referred to herein as "logs-to-metrics rules") for the customer to which the batch of log messages belongs to see if the log messages match any of the scope search expressions. Further details regarding logs to metrics rules and evaluation of scope search expressions will be described below.

For each matching scope search expression, translation engine 132 is then configured to execute a parse expression over the log message. Then, with the result of the parsing, translation engine 132 is configured to perform metric name and dimension mapping and send the resulting metrics data point to metrics processing engine 114 for processing as a metrics data point. With metrics data point(s) derived from log messages, the power of the logging and metrics backends (114 and 124, respectively) may be utilized in combination, as will be described in further detail below.

In some embodiments, upon performing logs to metrics translation, if any of the matched logs-to-metrics rules indicates that the log message (from which the data point was derived) should be dropped, the log message is removed. Otherwise, the logs processing engine is configured to continue to batch log messages into larger batches to persist them (e.g., using persistence engine 134) by sending them to an entity such as Amazon S3 for persistence. The batched log messages are also sent to log indexer 136 (implemented, for example, as an indexing cluster) for full-text indexing and query update engine 138 (implemented, for example, as a continuous query cluster) for evaluation to update all streaming queries. As one example, log indexer 136 is a full text indexer configured to parse raw log data into terms, and in some embodiments, add metadata fields and extracted fields. The use of a full text index to represent and store log data allows efficient querying of text logs. Other processing and persistence may also be performed as well, including storing the raw log messages in a batch in a storage system, or extracting structure from the log messages and persisting the resulting records in a format such as a tabular or columnar storage format in other storage systems.

Thus, platform 102, using the various backends described herein, is able to handle any received machine data in the most native way, regardless of the semantics of the data, where machine data may be represented, stored, and presented back for analysis in the most efficient way. For example, metrics are processed by a metrics backend, logs are processed by a specialized log backend, and logs that contain information better suited for processing as metrics are identified and processed as metrics (e.g., by synthesizing metrics data points from the logs). Further, a data collection and analysis system such as platform 102 that has the capability of processing both logs and time series metrics provides the ability to query both types of data (e.g., using query engine 152) and create displays that combine information from both types of data visually.

Figure 2:
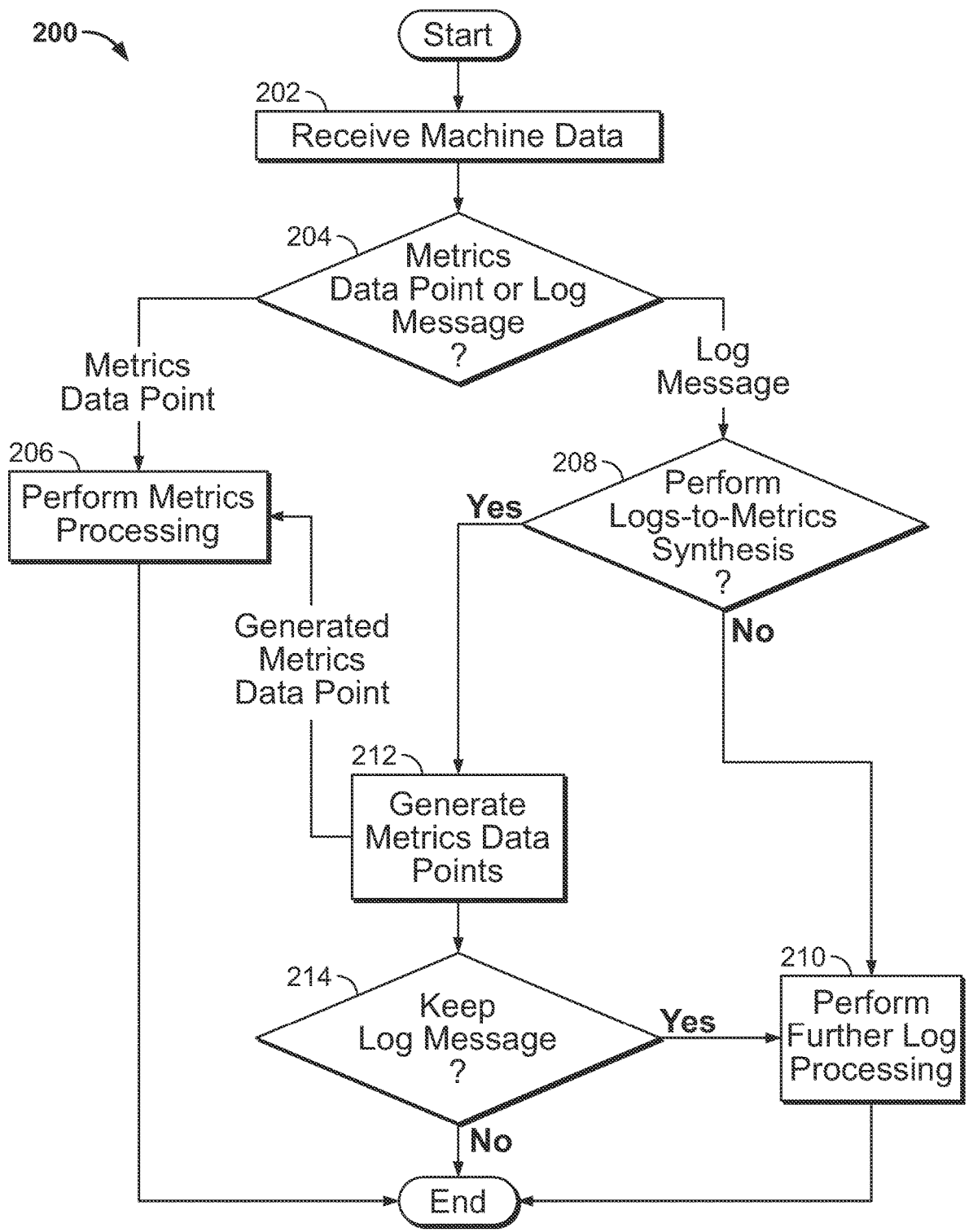
FIG. 2 is a flow diagram illustrating an embodiment of a process for processing machine data.

FIG. 2 is a flow diagram illustrating an embodiment of a process for processing machine data. In some embodiments, process 200 is executed by platform 102 of FIG. 1, which, as shown, includes backends for processing both log messages and metrics data points. The process begins at 202 when machine data is received. For example, a batch of items is read from a message queue. The batch of items includes machine data received from remote devices configured to collect the raw machine data.

At 204, it is determined whether the received machine data is a set of metrics data points or a set of log messages. As one example, the determination of whether the received machine data is metrics data points or log messages is based on the endpoint (e.g., https endpoint) at which the machine data was received. For example, machine data may be received at platform 102 at two different types of endpoints, where agent 104 is configured to send machine data (e.g., via an API) to one of the two different types of endpoints based on whether the machine data is log messages or metrics data points (e.g., native metrics). The two different types of endpoints may correspond to different formats of data.

If the received machine data is determined to be a set of metrics data points, then the process continues to 206, where the received machine data is processed as a metrics data point. This includes extracting the data points, resolving the time series for each data point given data point metadata (e.g., metric name, identifying dimensions), and adding the data points to the time series in a persistent manner. For example, the metrics data points are sent to a metrics backend such as metrics processing engine 114 to perform such metrics processing.

If, at 204, it is determined that the received machine data is a set of log messages, then log specific processing (e.g., timestamp extraction, field parsing using extraction rules, further augmentation, etc.) is performed. In this example, the process continues to 208, where it is determined whether logs-to-metrics synthesis should be performed. As one example of the processing performed at 208, as described above and will be described in further detail below, for each log message in the batch, all existing logs-to-metrics rules for the customer to which the batch of log messages belongs are consulted to see if the log messages match any of the scope search expressions in the logs-to-metrics rules. Further details regarding the determination of whether logs-to-metrics synthesis should be performed will be described in further detail below.

If it is determined that logs-to-metrics synthesis is not to be performed, then process 200 continues to 210, where further log processing is performed. In various embodiments, the further log processing performed at (210) includes batching log messages into larger batches and sending them to a data store (e.g., Amazon S3) for persistence, to the indexing cluster for full-text indexing, and a CQ (continuous query) cluster for evaluation to update all streaming queries. In some embodiments, the CQ cluster implements a streaming query engine. Streaming queries are evaluated against incoming data in real-time. In other words, in a streaming query system, all query results are continuously updated as new data is in coming in. This is in contrast to traditional (e.g., database) query engines, where new data is first persisted, and queries are executed by users explicitly, where to create the results, the traditional query engine is using the persisted data. This on-demand query execution to obtain results is in contrast to continuous query execution that allows for results to always be up-to-date.

If it is determined at 208 that logs-to-metrics synthesis should be performed, then the process continues to 212 where metrics data points are generated from the log messages. For example, for each matching scope search expression (determined at 208), at 212, parse expressions (e.g., specified in logs-to-metrics rules) are executed over the log message. With the result of the parsing, metric name and dimension mapping are performed. One log message may potentially result in multiple extracted metrics data points. The process then continues to 206, where metrics processing is performed on the metrics data point generated at 212 (e.g., by sending the metrics data points resulting at step 212 to metrics processing engine 114). At 214, it is determined whether the log messages from which metrics data points were generated at 212 should be kept. If not, then, the log messages are discarded. If the log messages are to be kept, then the process continues to 210, in which the further log processing is performed on the log messages to be kept.

Further Details Regarding Logs-to-Metrics Synthesis (or Turning Telemetry Logs into Metrics)

Types of Logs

The following are further details regarding example types of log messages that may be processed by platform 102. Log messages that are collected and sent to platform 102 for analysis may fall into one of the following example buckets:
Errors and stacktraces
Events
Telemetry Sometimes, a log message might actually fall into multiple buckets.

In some embodiments, errors and stacktraces get logged when the logging program runs into some sort of failure condition. Errors can be as simple as 2017/07/17 14:28:44.322 404 File Not Found, path=/some/file/path or as complex as full backtraces of the execution stack (known also as stacktraces, especially in a Java context).

Events capture the fact that something happened. An example of a canonical event is the following: 2017/07/17 14:28:44.322 Failed login for christine@sumologic.com—no such user. Typically, events follow some form of subject-verb-object scheme.

Finally, there are logs that capture some sort of telemetry. Often, those logs could potentially also be counted as events, such as the following: 2017/07/17 14:28:44.322 Page/some/page/uri rendered in 83 ms. Sometimes telemetry is logged periodically, in which case it is not really an event, such as in the following example: 2017/07/17 14:28:44.322 Hits for page/some/page/uri so far: 23. Further details regarding telemetry logs are described below.

Telemetry Logs

Telemetry logs may be created by a developer in a variety of different ways, such as the following example ways:
By simply writing relevant output to a file
By using a library that helps with recording metrics to logs
By using a metrics collection software
By utilizing facilities in the orchestration layer, such as Docker stats More often than not, developers log some telemetry in an adhoc fashion, for example by using a printf statement, such as the following example: printf ("Finished download file %s in %d", filename, elapsed). Real-world logs may have these kinds of messages in numerous places.

Sometimes developers may approach telemetry a bit more strategically and use a library that allows them to use a consistent way of capturing metrics and outputting them. Dropwizard Metrics is one example. After adding the library to the application, requests can be counted by using, for example, the following boilerplate:

```
private final MetricRegistry metrics = new MetricRegistry( );
private final Meter requests = metrics.meter("requests");
public void handleRequest(Request request, Response response) {
    requests.mark( );
    // etc
}
```

In this example, a library such as Dropwizard Metrics will then, depending on the configuration, periodically write out the current value of the "meter" to standard out (which often gets captured as a log file), or via a logging library like Log4J to a file. The following is one example from a log:
2017-07-13 13:44:44,145-0700 [metrics-log-reporter] INFO com.sumologic.util.scala.MetricsReporte—com.sumologic.util.scala.Aggregator.com.sumologic.util.scala.Aggregator.Buffer[REST-Buffering]-Meter.ForwardedMessage count=5, fifteenMinuteRate=0.04, fiveMinuteRate=0.00, oneMinuteRate=0.00, meanRate=0.00

In the above example, semantically it is being indicated that at time 2017-07-13 13:44:44,145-0700, the count of Aggregator. Buffer [REST-Buffering]-Meter.ForwardedMessage was 5.

Often times, developers also install host metrics collection software on a host, for example collected. This tool will periodically send host metrics such as CPU usage to a configured metrics collection point, usually on a remote host. Different protocols can be used for this, but one example protocol is the Graphite plaintext protocol (Graphite is an example of an open source metrics server):

aggregator.rest-buffering.forwarded-message 5 1500330221

These messages may be received by a Graphite backend server. But in case developers only have a logging solution in place and no metrics server is available, these kinds of plaintext logs can also be fed to the logging solution and the tools available there, if cumbersome, can be used for generating time series charts.

Finally, orchestration and container solutions such as docker allow collection of metrics from an API endpoint. In the case of docker, metrics are called stats, and are delivered in a JSON wrapper:

```
"cpu_stats": {
    "cpu_usage": {
        "total_usage": 44651120376,
        "percpu_usage": [
            44651120376
        ],
        "usage_in_kernelmode": 9660000000,
        "usage_in_usermode": 24510000000
    },
    "system_cpu_usage": 269321720000000,
    "throttling_data": {
        "periods": 0,
        "throttled_periods": 0,
        "throttled_time": 0
    }
}
```

Logs-to-Metrics Rules

As described above, the logs-to-metrics translation (e.g., performed by logs-to-metrics translation engine 132) is performed using logs-to-metrics rules. Further details regarding logs-to-metrics rules are described below. In some embodiments, in order to execute the logs-to-metrics translation, the data collection and analysis system described herein offers users a facility to create logs-to-metrics rules. An example interface for configuring a logs-to-metrics rule is described below in conjunction with FIG. 3. In some embodiments, a logs-to-metrics rule has the following example components:

Scope
    The "if" part of the rule; a search expression that determines which log messages to match and to perform the metrics translation on. The scope may be implemented as an expression of a filter on the data.

Transformation expression
    One or multiple transformation expressions to extract fields representing the metric name, the metric value, and any dimension values. In some embodiments, the transforming performed using the transformation expressions includes performing parsing of the log message using parse expressions/statements. In some embodiments, transformation is performed after parsing (e.g., concatenating the results from two parse statements, and performing enrichments/lookups, described in further detail below). As one example, the input to the transformation expression is the raw log message with the time stamp extracted, and potentially other fields already extracted (e.g., via field extraction rules). In one embodiment, the output of the transformation is a set of fields, either extracted here, or previously, or computed based on both. New fields may also be created by performing enrichment (e.g., looking up a country based on Internet Protocol (IP) address), which will be described in further detail below.

Metric mapping
    Maps one or multiple of the fields to metric name, which results in one or multiple data points being created The fields may be extracted, based on transformations of extracted fields, or new fields based on lookups/enrichment using extracted fields. An extracted, derived, or otherwise obtained metric value is mapped to a metric name Dimension mapping
    Maps one or multiple of the extracted fields to user-specified dimensions Whether to drop the log message
    Users might want to drop the log message after the translation has happened, for example, to save on storage cost The following is an example rule:

Scope
    _sourcecategory=alert DefaultPerCustomerLagTracker "current lag"

Parse expression
    parse "current lag: Some(*) ms," as nite_alert_lag_test-|parse "customer: *," as customer_id Metric mapping
    In this example, "nite_alertlag_test" is the metric name
    The value for the data point is the value of the field "nite_alert_lag_test"

Dimension mapping
    Key-value pair
    customer
    customer_id

Whether to drop the log message
    No

The various portions of the logs-to-metrics rules may be configured by users. Different packages of logs-to-metrics rules may be configured for different scenarios. For example, different configurations of logs-to-metrics rules may be installed with different dashboards and queries. The configurations may be stored and used by logs-to-metrics translation engine 132 of platform 102.

Figure 3:
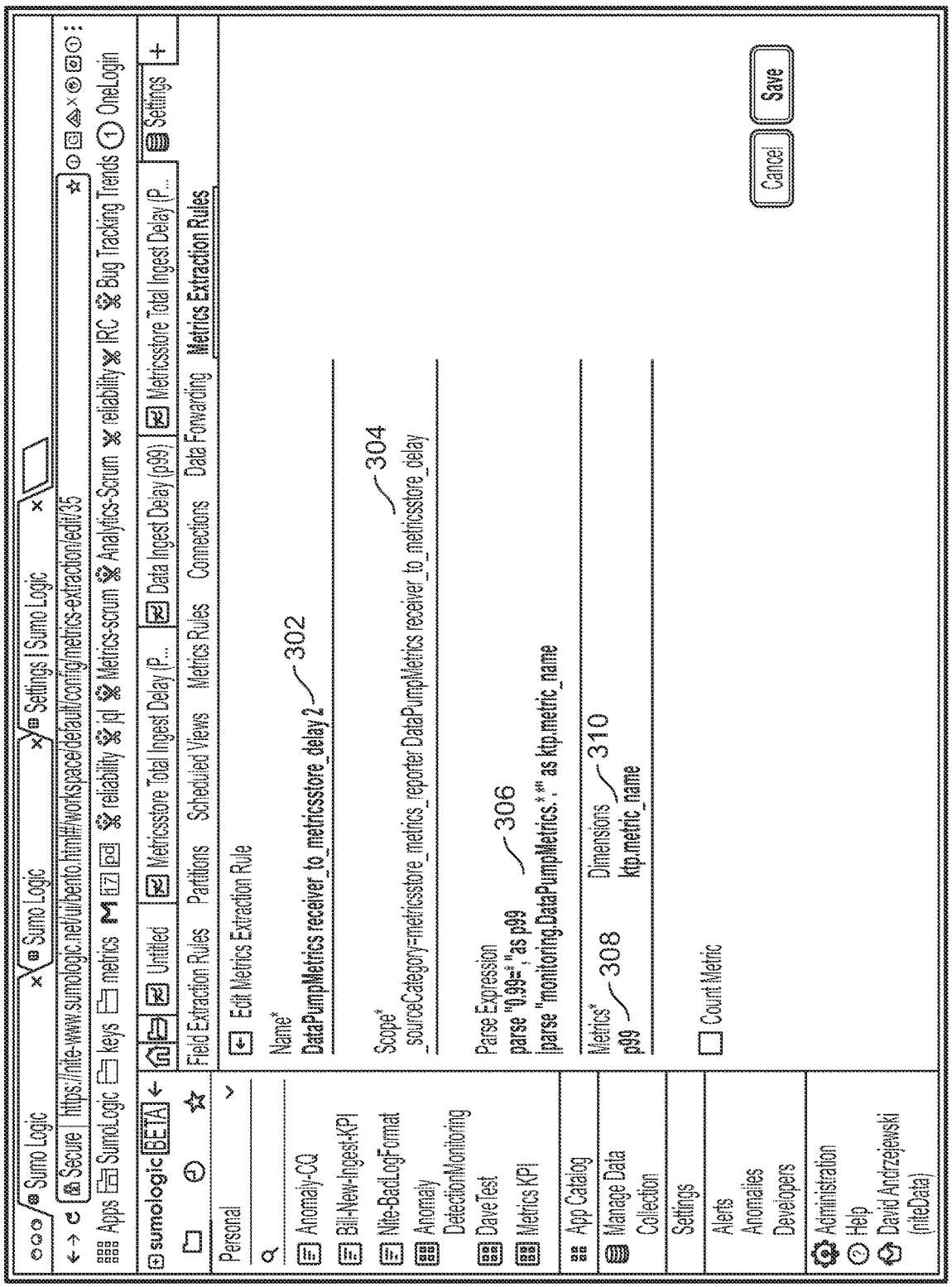
FIG. 3 illustrates an embodiment of a user interface for editing metrics extraction rules.

FIG. 3 illustrates an embodiment of a user interface for editing metrics extraction rules. In this example, configuration of a logs-to-metrics rule (as described above) is shown. At 302, the name of the metric extraction rule is shown. At 304, the scope of the logs-to-metrics rule is shown. At 304, the parse expression used to extract values from a log message and construct a metrics data point is shown. Metric mapping and dimension mapping (as also specified in the parse expression) are also shown at 308 and 310, respectively.

In some embodiments, logs-to-metrics rules may be defined such that metrics are created from the existence of the log itself. For example, suppose that a log indicates that "User X has logged in." The number of logins (e.g., count)

per user may be tracked over time. This would result in one time series per user, with one data point per login, where the value of the data point would, for example, be "1" as no other value is present in the log. Thus, time-based aggregation may be performed to obtain time-windowed counts (e.g., by minute, hour, etc.).

In some embodiments, users are allowed to configure or specify time-based rollups, where the data points are not stored individually as they are created (e.g., for data points that are derived from the telemetry that is contained in event-type logs, since this could generate many data points). Dimension based rollups may also be specified using logs to metrics rules. Rollups by both dimension and time may also be specified.

Example of Performing Logs-to-Metrics Synthesis

The following is an example embodiment of performing logs-to-metrics synthesis. On the highest level, suitable log messages (e.g., those containing at least some telemetry, if not exclusively) may be translated into metrics in one of two example ways. One example way is referred to herein as the direct translation. As described above, direct translation looks at each incoming log message, and if suitable, creates one or multiple data points for one or multiple time series from the original log message and feeds them to the metrics time series store. The user can configure whether the original log message will then be discarded, or whether it will be retained. The benefit of retaining the original log message will be explained in further detail below. The second example technique for translating logs to metrics is suitable for logs that do not themselves contain at least some telemetry, but are events rather. This example approach aggregates the occurrence of the events described in the log messages over time and creates data points for derived time series which are then fed to the metrics time series store. An example of the process of direct translation is described herein.

As used herein, a time series refers to a series of data points indexed (or listed or graphed) in time order. For example, a time series is a measurement of a process that may be a sequence taken at successive equally spaced points in time. Thus it is a sequence of discrete-time data. The sequence need not be equally spaced (e.g., as in the response time in web server logs example described above).

Referring to the example environment of FIG. 1, suppose that Alice is running software development and software operations (DevOps) for a warehouse storing fidget spinners. In order to manage the inventory of fidget spinners, various machines such as machine 106 are tasked with performing various jobs for Alice. Suppose that machine 106 is executing monitoring code that provides instrumentation or tracking of a service that is running on the machine, where the instrumentation code outputs numbers periodically. In some cases, the code outputs metrics directly, such as in a monitoring, telemetry-focused solution. However, in other cases, the instrumentation code simply writes out the telemetry data into a telemetry-style log message (e.g., via a printf statement).

Suppose, in this example, that the number of messages processed by a node in Fidget Spinner's infrastructure (e.g., as part of a receiver service) is being monitored, but the telemetry data is being transmitted by collector agent 104 in the form of a log message (rather than, for example, being outputted by a metrics library configured to emit metrics natively). It would be beneficial for Alice if such values (the number of messages processed) were stored as a time series metric, rather than being processed as a text log. For example, this would allow Alice to ensure that the individual messaging service is operating as intended. An example of telemetry data (e.g., the number of messages transmitted) being sent in the form of logs is described below.

Logs may be written using a simple statement in the code, for example to track the processing of batch input files arriving for the purpose of inventory updates at an ecommerce site from individual sellers. Note that in this example a more advanced case is being considered, where one log message actually includes telemetry for more than one metric. (This applies to log messages with only one metric as well.) In the below example logs, there are two pieces of telemetry data that are to be extracted from the logs and processed as metrics: message count (the number of messages transmitted) and the number of total bytes (the number of bytes transmitted).

printf("%s-%d messages transmitted, %d bytes, to output queue '%s' from input file %s for seller %s.," asctime (localtime(time(NULL)), count, total_bytes, out_queue, in_file, seller)

As one example, the resulting logs would look like the following:

2017/07/17 12:27:29—10 messages transmitted, 1234 bytes, to output queue 'inventory_update' from input file fscom20170716.csv for seller fidget.com.

2017/07/17 12:27:29—11 messages transmitted, 2048 bytes, to output queue 'inventory_update' from input file fscom20170716.csv for seller fidget.com.

2017/07/17 12:27:29—99 messages transmitted, 24484 bytes, to output queue 'inventory_update' from input file fscom20170717.csv for seller fidget.com.

2017/07/17 12:27:29—1 messages transmitted, 33 bytes, to output queue 'inventory_update' from input file 2017-07-17-spinner.csv for seller spinner.com.

2017/07/17 12:27:29—2 messages transmitted, 69 bytes, to output queue 'inventory_update' from input file 2017-07-17-spinner.csv for seller spinner.com.

Suppose that the service is configured to transmit messages from the host's FTP (file transfer protocol) server to platform 102, where each atomic message provides an update to an inventory item, as shown in the example log messages described above.

While Alice's code is emitting the count, Alice would like to ensure that she can troubleshoot any issues, such as being alerted when the inventory update count is not changing (i.e., it's stuck). In order for this to happen, the raw data should be semantically transformed into a form that allows it to be consumed. For example, interspersed in the above text logs are data values (e.g., for the number of messages transmitted and the size of the bytes transmitted), which would be better processed by metrics processing engine 114 rather than being indexed as a log.

Using the techniques described herein, the data points in these logs may be stored as metrics time series. For example, platform 102, using logs to metrics translation engine 132, is configured to identify logs that include telemetry data that should be synthesized into metrics, extract numerical value(s) from the logs, and place the numerical values in, for example, time series database 122 (e.g., implemented as a key-value pair store such as Cassandra). In some embodiments, the log message is preserved and continues to be processed by log indexer 136.

The logs are evaluated using logs-to-metrics rules, such as those described above. First, for example, the scope portion of the logs-to-metrics rules (e.g., a search expression) is used as a filter to determine whether a log message matches the scope of the search expression and thus logs-to-metrics translation should be performed on the log. For example, a search expression is used to search the log messages for the value "inventory_update." As another example, "messages transmitted" AND "to output queue" is used. This would catch other output queues, and be more restrictive, as it captures most of the invariant portion of the log message.

Next, because the log messages have matched the scope of a logs-to-metrics rule and are to be translated, parse expressions in the logs-to-metrics rule are used to extract fields from the log messages that are used to create metrics data points. As one example, the user is allowed to specify or configure a way to parse the logs to extract various fields. This can be accomplished, for example, with regular expressions. As one example, the user can specify the following regular expression:

(?<timestamp>\d{4}\/\d{2}\/\d{2}\d{2}:\d{2}:\d{2})—(?<message_count>\d+) messages transmitted, (?<total_bytes>\d+) bytes, to output queue '(?<output_queue>.+?') from input file (?<input_file>.+?) for seller (?<seller>.+).

In some embodiments, the logs-to-metrics translation engine interprets the extracted field timestamp to represent the timestamp of the data point to be generated. In this example, the regular expression is used to both extract fields from the log messages, as well as map them to portions of metrics data points (e.g., metric name, key-value metadata pairs, etc.). Since this log contains values for two separate metrics (message_count and total_bytes), the user specifies mappings of the extracted fields to values. For example, the user configures the translation as the following (which may be done, for example, via a graphical UI):

values=[message_count, total_bytes]

Now the system (e.g., platform 102) knows to take each log message and create two metrics data points, one for metric message count, and one for metric total bytes. The system also knows, for example by convention (and parse expression), which is being followed here, that the (required) timestamp is in field timestamp. If no timestamp field was present, and if no other field was designated in some configuration (of the logs-to-metrics rule) to be used for the timestamp, the current time is assumed in some embodiments. In some embodiments, all remaining fields extracted from the log message are then considered metadata identifying the time series to which the data points created for the two metrics for the log message belong. In this example, the two data points from the first log message will then be internally represented as data points:

1. 2017/07/17 12:27:29, 10, message_count, output_queue=inventory_update, file=fscom20170716.csv, seller=fidget.com 2. 2017/07/17 12:27:29, 10, total_bytes, output_queue=inventory_update, file=fscom20170716.csv, seller-fidget.com In this example, the canonical format to represent the data point used here is: timestamp, value, metric name, key1=value1, . . . —this is but one way to represent in-memory data structures. In some embodiments, the metric mapping and dimension mapping portions of the logs-to-metrics rule are used to determine metric names, values, and other metadata for the metrics data point. The remaining log messages may then be represented. This results with time series for two metrics (message_count, total_bytes) multiplied by unique identifying key-value pairs (there may be an additional consideration where some key-value pairs are considered identifying, and others are not—identifying/non-identifying metadata will be described in further detail below)) for a total of 6 time series here in this example.

1. message_count, output_queue=inventory_update, file=fscom20170716.csv, seller=fidget.com 2. total_bytes, output_queue=inventory_update, file=fscom20170716.csv, seller=fidget.com 3. message_count, output_queue=inventory_update, file=fscom20170717.csv, seller=fidget.com 4. total_bytes, output_queue=inventory_update, file=fscom20170717.csv, seller=fidget.com 5. message_count, output_queue=inventory_update, file=2017-07-17-spinner.csv, seller=spinner.com 6. total_bytes, output_queue=inventory_update, file=2017-07-17-spinner.csv, seller=spinner.com In this example, each of the 10 data points created from the 5 distinct log messages will become part of one of the 6 distinct time series.

In some embodiments, once the data points are created in memory, they are committed to persistent storage such that a user can then query the information. In some embodiments, the process of storing data points includes two distinct parts and one asynchronous process. First, based on identifying metadata, the correct time series is identified and the data point is added to that time series. In some embodiments, the time series identification is performed by time series resolution engine 118 of platform 102. Secondly, a metadata index is updated in order for users to more easily find time series based on metadata. In some embodiments, the updating of the metadata index (also referred to herein as a "metadata catalog") is performed by metadata catalog update engine 140. Afterwards, in some embodiments, an asynchronous process is triggered that periodically rolls up the data points in the metric time series to create more compact representations by, for example, applying a statistical function to data points in the time series that fall into the same time intervals (for example, 10 seconds, 1 minute, 1 hour, 1 day).

An example of a process of adding the data point to the correct time series is described as follows: first, the metric name and the identifying metadata are determined:

2017/07/17 12:27:29, 10, message_count, output_queue=inventory_update, file=fscom20170716.csv, seller=fidget.com For this example data point, the identifying metadata is output_queue=inventory_update, file=fscom20170716.csv, seller=fidget.com and the metric name is message_count. In some embodiments, the storage backend maintains a data structure such as a table in a database for each time series. Metric name and identifying metadata together may be used to determine the name of the table using a canonicalization, such as the following:

message_count::file=fscom20170716.csv::
output_queue=inventory_update::seller=fidget.com In some embodiments, the metrics time series storage system looks up a table (or any other appropriate data structure) with the above name, then inserts, for example, a new row into the table, where as one example, the row looks like the below, as shown in the example of Table 1:

TABLE 1

| message_count::file=fscom20170716.csv::output_queue=inventory_update::seller=fidget.com | |
|---|---|
| Timestamp | Value |
| 2017/07/17 12:27:29 | 10 |

As one example, the table is stored in time series database 122. Once the identity of the time series is known, the data can be queried easily by scanning the table (or any other appropriate data structure representation) that includes the data points over time.

In order to query time series however, a user has to know that they exist in the first place. In some embodiments, in order to allow this, a metadata index (stored, for example, as metadata catalog 142 of platform 102) is also updated to allow flexible discovery of time series based on their metadata. In some embodiments, the metadata index is a persistent data structure that maps metadata values for all keys to a set of time series identified by that value of the metadata key.

Assuming the above listed time series, but in canonicalized form, there is an index that represents each time series (1, 2, . . . , 6):
 1. message_count:output_queue=inventory_update::file=fscom20170716.csv::seller=fidget.com
 2. total_bytes::output_queue=inventory_update::file=fscom20170716.csv::seller=fidget.com
 3. message_count:output_queue=inventory_update::file=fscom20170717.csv::seller=fidget.com
 4. total_bytes::output_queue=inventory_update::file=fscom20170717.csv::seller=fidget.com
 5. message_count:output_queue=inventory_update::file=2017-07-17-spinner.csv::seller=spinner.com
 6. total_bytes::output_queue=inventory_update::file=2017-07-17-spinner.csv::seller=spinner.com In this example, first, indexing is performed by metric name, as shown in the example of Table 2, below:

TABLE 2

| Metric name index | |
|---|---|
| message_count | [1, 3, 5] |
| total_bytes | [2, 4, 6] |

It can be shown, for example in a UI, that there are two metrics, with 3 occurrences each: message_count, and total_bytes. Assuming, for example, the user selects message_count, it may then be shown that there are three metadata fields further identifying the time series for metric message_count. In some embodiments, to allow this, an index is kept or maintained of metadata key-value pairs mapping to the time series they are partially identifying, as shown below in the example of Table 3.

TABLE 3

| file | fscom20170716.csv | [1, 2] |
|---|---|---|
| file | fscom20170717.csv | [3, 4] |
| file | 2017-07-17-spinner.csv | [5, 6] |

As described above, the metadata catalog is used to support or otherwise facilitate querying and user interaction. For example, a UI can be built based on the information in the metadata catalog, with the UI listing all of the metrics that are maintained by the platform. For example, the metadata catalog can be used to present to a user the number of time series in which a metric exists (e.g., based on a count of the number of time series that the metric name appears in).

If a user wishes to plot a time series, the appropriate time series tables can be identified because the metadata catalog/metrics index would indicate which time series a metric appears in.

In addition to indexing metric names, all of the key-value pairs (e.g., used as metadata for the metrics data points) may also be indexed. For example, a table may be implemented that indicates the time series in which a given key-value pair appears in.

In some embodiments, the metadata catalog stores the names and the associated key-value pairs for each metric. In some embodiments, the metadata catalog also stores, for each metric, a pointer to the table where the raw, actual data for that metric is stored. In other embodiments, rather than storing a pointer, a pointer or reference is computed from the metric name and key-value pairs. Relevant metrics and time series may then be identified and retrieved using the metric name and key value metadata.

At query time, the above mentioned indexed information can be intersected to determine what set of time series should be accessed that are relevant to the category. I.e., the catalog information is used to drive discovery of what information is maintained in platform 102. For example, the user may enter a series of queries for metric names, as well as other metadata, and all time series that match the query may be identified using the metadata catalog and surfaced to the user.

In one embodiment, the information in the metadata catalog is used to provide an auto-complete wizard for metrics querying. For example, the devops user may not know what customers they have. The user can query the platform for all inventory updates metrics, for which there may be different ones for different customers of the fidget spinner inventory manager warehouse.

In one embodiment, the metadata catalog is implemented as a table, where each row corresponds to a different metric, wherein the columns include the name of the metric, and then different columns for all of the possible metadata keys in the key-value pairs (e.g., customer name, host name, fidget spinner color, etc.). References to time series in which metrics by that name appear may also be stored (or computed from the metric name and key-value metadata).

Thus, as shown in the above example, from a single stream of machine data, different types of log messages and metrics will be handled appropriately by a backend of platform 102.

Alice may view the raw log event data using a full text indexing query and see the error that the service could not communicate with its message queue. Alice is also able to view a count (numerical metric) and see the error. Thus, even though a single stream is coming in, all as log data, as a string of printfs, different log messages in the stream may be treated and handled differently by storing them in specialized backends to obtain various efficiency gains. Further, both logs and metrics may be presented at once, in the same analytics pane, which is beneficial to a user such as Alice. For example, Alice, as devops, when she sees that the count has not moved, can investigate why by looking at the raw log event message from which the metric was derived. By looking at the text of the raw log events associated with the metric count, Alice can see that the service is unable to communicate with the message queue.

Examples of various interfaces (e.g., query interfaces) will be described in further detail below in conjunction with FIGS. 7-15.

Figure 4:
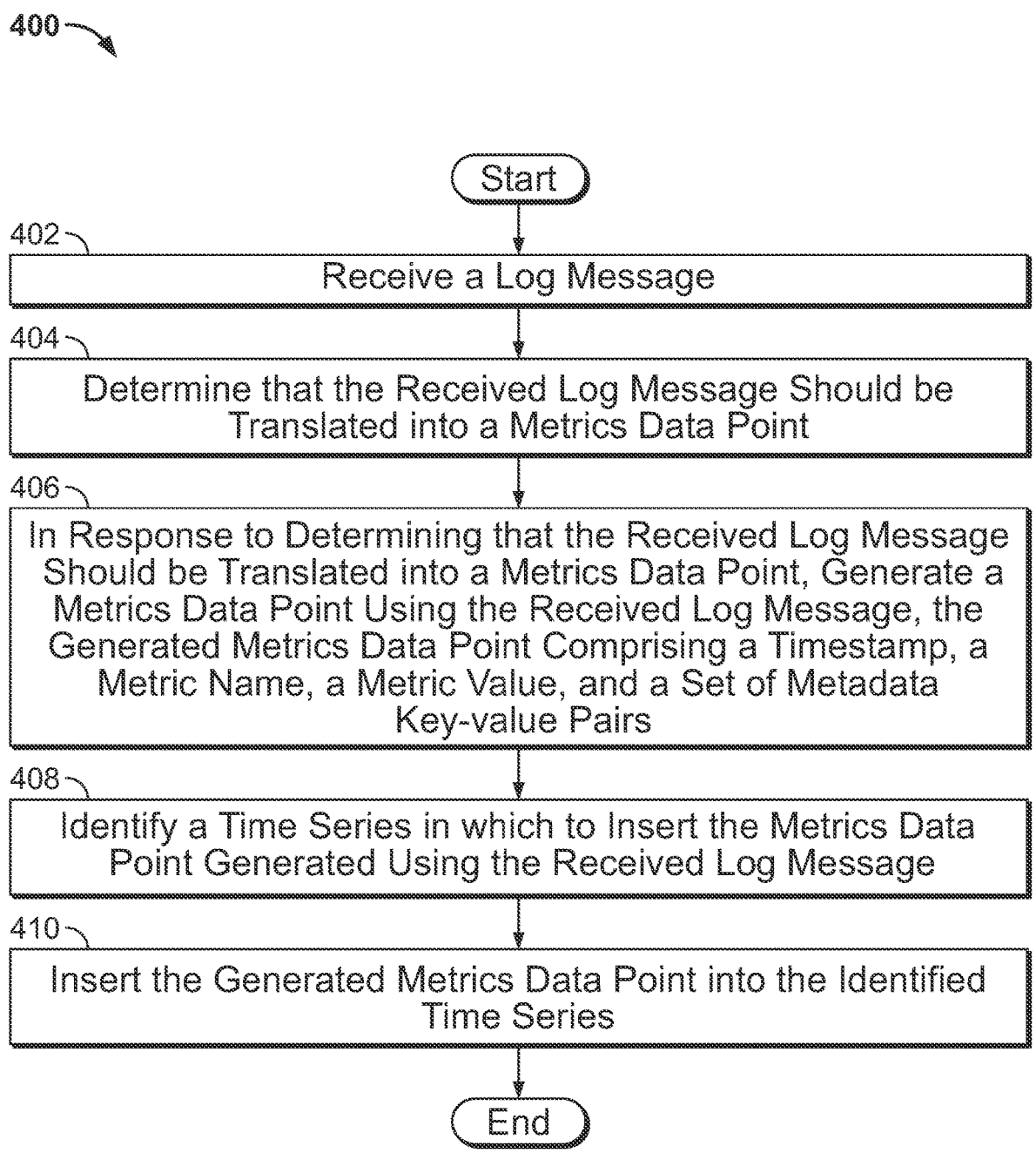
FIG. 4 is a flow diagram illustrating an embodiment of a process for logs-to-metrics synthesis.

FIG. 4 is a flow diagram illustrating an embodiment of a process for logs-to-metrics synthesis. In some embodiments, process 400 is executed by platform 102 of FIG. 1. The process begins at 402 when a log message is received. For example, the log data is received from a remote device. The log message is processed by a logs processing backend such as logs processing engine 124.

At 404, it is determined that the log message should be translated into a metrics data point. In some embodiments, the determination at 404 is performed by evaluating the log message against one or more logs-to-metrics rules, such as those described above. For example, the log message is evaluated against a scope search expression that filters the log message according to the expression. If the log message matches the scope of the search expression defined in the log message, then it is determined that the log message should be translated into a metrics data point.

At 406, a metrics data point is generated using the log message. In some embodiments, the metrics data point comprises a timestamp, a metric name, a metric value, and a set of metadata key-value pairs. As one example, a transformation expression (e.g., regular expression) in the logs-to-metrics rules is applied to extract values from the log message and use the extracted values to construct the metrics data point. For example, the one or more multiple parse expressions are used to extract fields representing the metric name, the metric value, and any dimension values from the log message.

As described above, the metric value may be obtained from an extracted field. In other embodiments, the metric value is derived from an extracted field, for example, by preforming an operation on the extracted field. For example, a mathematical operation may be used on the extracted field value to change a field value from being in second to being a data point value in milliseconds.

In some embodiments, the transformation expression (which may include a parse expression) is also used to obtain a timestamp if one is included in the log message, which is then added to the metrics data point. If the log message does not include a timestamp, then in some embodiments, a current system time is used as the timestamp for the metrics data point.

In some embodiments, generating the metrics data point further includes performing metric mapping and dimension mapping. Metric mapping includes mapping one or multiple of the extracted fields to a metric name, which results in one or more multiple data points being created. Dimension mapping includes mapping one or multiple of the extracted fields to user-specified dimensions, which, in some embodiments, are the key-value metadata pairs of a generated metrics data point.

In some embodiments, a new field in the metrics data point is derived from fields of the log message. For example, a new field may be derived by concatenating two extracted fields. As another example, an extracted field (either already present in the log message or extracted explicitly), may be used for enrichment, for example, by looking up a new field based on the value of an extracted field from a lookup table or an external service, as will be described in further detail below.

The logs-to-metrics rules also specify the data structure for the transformation. More than one metrics data point may be generated from a single log message. Thus, the log message, originally received in one format (e.g., as a string printf statement) is transformed into a metrics data point data structure including a metric name, a set of metadata key-value pairs, and a timestamp.

In some embodiments, metadata enrichment/augmentation is performed to add additional metadata key-value pairs/dimensions to the generated metrics data point, further details of which will be provided below.

In some embodiments, the generated metrics data point is then passed to a metrics processing backend such as metrics processing engine 114 (machine data that was received natively as metrics would be directly processed by the metrics processing engine backend).

In some embodiments, steps 404 and 406 of process 400 are examples of steps 208 and 212 of process 200 of FIG. 2.

At 408, a time series is identified in which to insert the metrics data point generated using the log message. As one example, a name or identifier of a time series is derived based on at least some of the metric name and key-value metadata pairs of the metrics data point. In some embodiments, the metadata of the metrics data point is designated as identifying or non-identifying metadata, where the key-value pairs designated as identifying metadata are used to identify metric time series.

As one example, the identity of the time series to which a metrics data point is to be added is created, derived, or otherwise determined by "mangling" together various portions of information included in the metrics data point, such as by mangling together the metric name and a canonicalization of key-value pairs (e.g., identifying metadata). For example, the fields total bytes, the name of the seller, name of the customer, etc. may be used to derive the time series identity. Thus, by mixing the metric name and selected key-value pairs together, a unique time series identifier may be determined. In some embodiments, there is a one-to-one correspondence between a metrics data point and a time series. For example, while two metrics data points may have the same metric name, they may have different key-value pair metadata, resulting in them being added to different time series (the time series identifiers derived for the two data points would be different).

At 410, the generated metrics data point is inserted into the identified time series. In some embodiments, the time series are stored in a specialized time series database. In one embodiment, the time series is implemented as a table in the time series database. As one example, the table includes two columns, one for timestamps, and one for values. The timestamps and values are stored as key-value pairs. Each row corresponds to a data point. When the time series is inspected, each row, as a data point, is visually represented, which collectively provides a visual representation of the time series. Other data structure representations may be used. In some embodiments, a generated metrics data point is inserted into the time series by adding the metrics data point as an entry in the table (e.g., as a row in the table). The location of the time series is obtained using the identifier derived from the information associated with the metrics data point.

In some embodiments, in addition to storing a metric value into a time series database, an update to an index data structure such as a metadata catalog is also performed. In one embodiment, the metadata catalog is a data structure that includes a list of the names of all of the metrics that have been computed. For each metric name, the metadata catalog further indicates what time series are associated with the metric (e.g., what time series the metric name appears). The updating allows users to find the time series and access the metric time series data. This is done by using key-value metadata so that users can make queries using key values. The metadata catalog is a data structure that records the key values for names of metrics, and for each of the metric names, records a list of time series that include metrics by that name. For example, suppose the metric name is "inventory update." There may be multiple time series that track the inventory update metric for different sellers (i.e., multiple sellers may track inventory updates, but each seller should have its own "inventory update" time series). Using key-value pair metadata, entries in the metadata catalog map to relevant time series.

Thus, when Alice queries for time series to view, the metadata catalog allows stored data to be surfaced again. Thus, Alice can view metrics time series data, even though the data originally came in the form of a log message.

Thus, using the techniques described herein, for each log message, zero or more data points are generated such that a log message, including a string, is transformed into a metrics data point with key-value pairs. For each data point generated, updates are made to a time series database and a metadata catalog. For example, a first entry is made to a time series database, and a second entry is made to a metadata catalog.

In some embodiments, it is determined whether to keep the log message or to discard it. For example, the original log message, after being transformed, may either be discarded (e.g., to save space costs for the customer and the platform), or it is maintained and preserved. The log message may include data that is not stored as part of the metrics data point. For example, the log message may have both metric telemetry data and also textual information. Thus, the same log message may be transformed into a metrics data point to be stored to a time series, as well as indexed by the log indexer. In some embodiments, the determination of whether to keep the log message is based on a configuration of the logs-to-metrics rule (e.g., specified by the user when configuring logs-to-metrics rules).

If the log message is to be kept, then further logs processing is performed, such as persisting the log message. As another example, the log message is stored to a full text index. If it is determined that the log message should not be kept, then it is discarded.

As one example, an agent on a monitored client may send a stream of data, where an event causes the agent to printf information that also has some metrics in it. For example, in response to a failure to write an event, a printf statement may be triggered that includes a numerical value (e.g., payload size==number of bytes filed), as well as text information explaining why the failure occurred (e.g., failure to write to message queue, DNS (Domain Name System) address resolution failure). Using the techniques described herein, the metric value may be extracted from the log message to generate a metrics data point that is added to a time series. Alice may also want to keep the raw log message because it includes an explanation of why a particular write to the message queue did not work. In such a scenario, the log message may also then be kept and indexed. When Alice views the failure bytes time series, she can view both the metric values as a time series, as well as the indexed log data text corresponding to the data points of the time series. Thus, logs and metrics, though forked and stored in separate, specialized backends, may be unified in the query interface.

In some embodiments, if the log message is kept, an identifier of the log message from which the generated metrics data point was derived is stored as metadata for the metrics data point. For example, a synthetic metadata key-value pair message_id==1234 is created and added to the metrics data point. This establishes a link between the metrics data point and the log message from which it was derived. This link may be used when a user queries and explores the time series to which the data point is added, as will be described in further detail below.

As one example, if the log message is preserved, it is stored to a logs index, separate from the metrics data point, which is stored to a time series data store. The two pieces of information (metrics data point and log from which it was derived), though from different backends, may be unified together in the user interface. The information may be unified by using certain metadata such as message identifiers (identifiers of the original log message, which are associated both with an indexed and preserved log message, as well as included as (non-identifying) metadata of the metrics data point(s) created from the log message).

For example, upon selecting a data point when viewing a time series, the identifier in the metadata of the data point can be used to perform a query or lookup of the raw message from the log data store.

As will be described in further detail below, query interfaces may also be provided by a platform such as platform 102 to allow a user such as Alice to query the various backends of the platform. For example, the platform provides a log query interface for querying logs. The platform also provides a metrics query interface for querying metrics. With respect to metrics, because metrics data points are stored in a specialized backend in a key-value format representation, the metrics can be navigated in a structured way, using key values, different from the way in which log queries may be accessed.

For example, suppose that Alice is viewing a time series. She observes a spike. The message identifiers for the data points in that time range may be used to automatically obtain the raw log messages corresponding to the spike in time. As another example, the raw log messages may be further sliced or grouped by other metadata dimensions, such as the instances of a service that were running on particular hosts during overlapping time windows. Thus, using the metadata described herein, a user such as Alice may transition from viewing time series to performing log analysis.

As another example, suppose that log messages from a certain host of a machine are being recorded and streamed to platform 102 for analysis. Suppose that Alice would like to explore the number of bytes that could not be sent by the host. Using the metadata catalog, Alice can query for the host, where the time series associated with the host can be returned. Alice can then view the time series. The log messages that share the same host metadata in common can then be identified. That is, the time series and the host emitting the logs used to derive the metrics can be identified and correlated using the metadata.

Thus, using the techniques described above, the platform receives a unified stream of raw machine data. The platform determines how to selectively process information in the unified stream, where some data is processed and stored to a specialized log indexer, other data is selectively processed and stored to a metrics time series database, and some data in the unified stream is selectively transformed from a log format to a metrics data point to be stored to the specialized metrics time series backend (i.e., determine that log message should be metricized). Thus, the platform determines the optimal manner of processing logs, metrics, and logs that include information that would better be processed as metrics.

Further Details Regarding Metadata

There may be metadata attached to logs, to time series, and potentially to individual data points within a time series. An example case of per-data point metadata is further described below. What is common in terms of metadata for logs and metrics time series is looked at first. In some embodiments, every log and every time series has built-in metadata attached to it. In some embodiments, the built-in metadata is by convention in a prefixed namespace. This metadata may be defined, such as source category, source name, and source host. As one example, these are mapped to keys called _sourcecategory, _sourcename, and _sourcehost. In some embodiments, every log message has these metadata fields. Metadata may also be added through processing rules at ingestion time. This metadata may include keys and values extracted from the message itself, or metadata otherwise gathered from external sources based on metadata already present in the log message, or in the raw text of the log messages (e.g., via metadata enrichment/augmentation, as described in further detail below). Examples: looking up IP reputation data and attaching the result as metadata to the log; or: resolving the present _sourcehost to an IP address, and looking up the instance owning that IP address within AWS to then attach instance specific metadata to the log.

For metrics time series, the same built-in metadata may also exist (_sourcecategory etc.) plus some metadata that is specific to the time series use case. In some embodiments, each time series has a metadata field content type (_contenttype) which represents the format type of the metrics source. Time series collected from metrics data sources such as AWS CloudWatch may have a different format than, for example, time series collected from a Graphite source. In some embodiments, there is also a metadata field to represent the name of the metric ("CPU usage"), which in this example maps to _metric. Metrics Rules may also be used to allow processing of incoming data points such that existing metadata can be changed or new metadata synthesized for each incoming data point. Further details regarding metrics rules and metadata modification/synthesis are described below.

For metrics time series, metadata may include: identifying vs. non-identifying metadata. A time series is made up of individual data points. In some embodiments, metrics data sources emit individual data points. At the receiving end, the system described herein is configured to understand which time series a data point belongs to. This is done to determine where and how to persist the data point. However, it may be useful so that users can easily see, for example, the history over time of a metric like CPU usage for a particular metrics data source, such as a specific machine. In this example case, all the data points that over time represent a time series should share metadata that is termed "identifying." Identifying metadata refers to the set of metadata that maps a data point to a time series. In some embodiments, a time series has identifying metadata. In some embodiments, this is expressed logically as a Boolean value associated with the key of a key-value pair: for example, true is the key, and therefore the dimension represented by the key is identifying, false otherwise. Time series may have non-identifying metadata as well. For example, for Graphite sources, the system-reserved and populated metadata fields _metric (the metric name), _sourceId, and _rawname are identifying. But additional interesting information about the time series, such as the type of the AWS instance that produced the data points for this time series, might not be considered identifying. Non-identifying metadata may include additional information. Care should be taken when choosing identifying metadata. If a value for an identifying key for a logical time series changes, this will result in the creation of a new time series and might not be desired.

In some embodiments, identifying metadata is governed by the system. Non-identifying metadata may be added by the metrics data source to represent additional interesting information about the time series. Non-identifying metadata may also be added during ingestion processing, where a processor may be set up that performs non-identifying metadata addition based on a set of rules. Finally, users might also want to attach non-identifying metadata to time series, for example in order to remember certain things, for example, as a result of an investigation: comment, Machine was foobared—ignore this. Non-identifying metadata for a time series may change over time, and at any given point in time represents the latest state. In some embodiments, changes of non-identifying metadata over time are also recorded and attached to the time series (for example, as non-identifying metadata).

In some embodiments, the designation of whether metadata is identifying or non-identifying is user configurable. For example, suppose that a machine is providing machine data about its performance. The machine goes down and comes back up (with a different machine identifier). The configuration can be specified such that the metrics collected before and after the machine came back up are different time series (where the change in the machine identifier is used to generate the time series identifier). Alternatively, the configuration can be specified such that the machine identifier is not used in generating the time series name, and the metrics before and after the machine came back up are associated with the same time series.

Non-identifying metadata may change. One example strategy for handling the changes in non-identifying metadata is to update the time series with new non-identifying metadata when it is changing. Another example strategy for handling non-identifying metadata is to associate non-identifying metadata with a time range of validity.

Metadata may also be attached to individual data points within a time series as well. In this example scenario, the metadata on a data point may be considered as an annotation. This metadata may be generated by the metrics source, or it can be added as part of the ingestion pipeline processing. Metadata may also be added in response to an explicit user action.

The metrics source can choose to add per-data point metadata in order to persist certain facts that are of interest. For example, many metrics are generated by sources via some process of sampling. Suppose it is desired to turn disk usage by disk partition into a set of time series. In this example, the metrics source would typically call operating system facilities to figure out the disk space used per disk partition every 10 seconds, and produce one data point for as many time series as there are disk partitions. Further suppose that this kind of actual disk usage checking has a performance penalty. The metrics data source might observe that local resources on the machine on which it is running are becoming contended, and decide to back off its sampling rate to 60 seconds in order to save resources. In this case, users may like to know that a sampling rate change has happened; in this example, all the metrics data source has to do, using the techniques described herein, is to add a metadata key-pair sampling_period, 60 s to each data point produced in that period. Users can then reason over the fact that the sampling rate was reduced, and this fact is not lost.

Thus, there may be metadata at both the time series level and at the level of an individual metrics data point.

As an example for metadata added by the ingestion pipeline processing, suppose it is desired to memorialize the result of a threshold check for CPU metrics data points. In some embodiments, within the ingestion pipeline, a processor evaluates all incoming data points for time series of type cpu_usage_percent. The processor may act based on a rule to check for CPU usage being larger than 75%, and CPU usage being larger than 90% (or any other threshold as appropriate), and to annotate each data point for these time series with a key-value pair usage_alarm, yellow when CPU usage is >75% and <90%, and usage_alarm, red when it is >=90%. This is useful to allow users to further filter what they want to see: show me all the time series for which there is a usage_alarm, or: show me all the time series for which there is a usage_alarm of red.

Users can also add annotations in the form of metadata to individual data points. Returning to the CPU usage example again. As part of a troubleshooting session, the user, potentially by using additional filtering based on usage_alarm metadata added by a processing rule during ingestion, has determined that a particular set of logs corresponds with the root cause of the CPU usage alarm. The user would like to know or remember the time range and the query expression to find those logs again later. This is made possible, for example, by letting the user attach query_timerange and query_expression metadata to say, all the usage_alarm, red data points in the relevant time series.

In some embodiments, per-data point metadata should not be identifying for the time series, as otherwise a new time series would logically be created whenever the set of key-value pairs for data points within a time series changes. In some embodiments, what metadata should be excluded from being identifying metadata is configurable. Further details regarding cardinality of time series are described below.

Cardinality of Time Series

There is typically a large number of metrics time series for each customer. Often times, users want to query the metrics time series in aggregation. A user might want to see, for example, the average of all CPU usage over time in a cluster of machines, rather than looking at the CPU usage time series of a single machine in the cluster. When they query the system, users will then specify only a subset of the identifying metadata they are interested in, and might not specify all of the identifying metadata for each time series. The system will then match all the time series identified by the subset of identifying metadata provided, and execute the query using a desired aggregation function (average, 99th percentiles, ...) over all the data points in all the time series. Depending on the scope of the customers' infrastructure and depending on how the query is formulated, this can cause a very large number of time series to be included in the query. This then means that a great deal of effort must be made in order to retrieve the value and ultimately execute the query and present the result back to the user. In other words, processing can become slow—even though it is a valid query, semantically and from the users perspective.

This becomes even more challenging in an ephemeral world. Assuming a cluster of machines that live in the cloud, then there are not actually real physical "machines" but rather virtual machines, or "instances," for example, in the parlance of Amazon Web Services. Clusters may be autoscaled. This means during quiet periods, the cluster includes perhaps only 200 instances, while during heavy load periods, there might be 2000 instances. Often, clusters are scaled up and down during the day, as most workloads show fluctuating load patterns over the course of 24 hours (e.g., business hours vs. night time). When clusters are scaled up and down, or when hung or broken instances are replaced, this means instances are terminated and new instances are being started. The lifetime of an instance can sometimes be as short as a couple of minutes and is often not longer than a few hours. From a perspective of time series identification, each instance counts as a new source. A new instance therefore produces new time series (CPU usage, and so on). The result is that even for just a single cluster and a single metric, there will be a very large number of time series to consider for aggregation queries. Even though a cluster never had more than 1000 instances running at the same time, the actual total number of time series for just one metric could easily be 2 or 3 orders of magnitude higher.

Another cause for explosion in number of time series for a single metric is the common use case of tracking metrics for ephemeral user interaction sessions with a web site. Consider a typical e-commerce web application; users arrive and browse the site, and maybe end up adding to a shopping cart and checking out. This is tracked as a session; most web apps will do this by assigning a session ID, even if the user is not logged into the e-commerce site. During the user's interaction, the web app is tracking response times for page loads, for example, on a per-session level as time series. In such a setup, even moderately busy sites could create thousands of unique time series per day, which sums up to hundreds of thousands of time series over time.

One example solution to protect the system from high query overhead and therefore slow queries and bad user experience is to limit the number of unique values allowed for any given metadata dimension (e.g., restrict or exclude some metadata from being identifying metadata). So for example, the system would reject any new time series to be created when there's more than 1,000 _sourceIDs (or sessionIDs in the second example.) The system can also choose to accept those time series, but then limit its consideration in query to only, for example, 1,000 unique time series. However, this may create an even worse experience—either time series are just flat out rejected and missing from the system, or the user will have to live with incomplete results and a warning informing them that only 1,000 time series have been considered in computing the result, without allowing the user to do anything about it. This is a typical tradeoff scenario between protecting the system and limiting the user.

One solution is to enumerate all time series the system has ever seen over time matching the given subset of metadata in a query. However, an improved solution is for the system to track, for each time series, a low and high watermark in time—e.g., the timestamp of the first data point in time, and the last data point in time for any time series. Then, when a query needs to resolve the time series matching the subset of metadata given, the resulting set of time series is also intersected with the time range given as part of the query. Example: average CPU usage for all instances of cluster "frontend" for today. In this case, even though over time and given the described ephemerality of instances in cluster "frontend," there could be many thousands of instances in total, and therefore as many time series for metric CPU usage. In fact, given the query time range of "today," there are only 100 s of instances that are still running, have been started today, or have run for at least a part of today. As the metadata system tracks not just the mapping described above between metadata and time series, but for each unique time series also the interval in time for which it was observed active, it is now possible to select a much smaller set of time series to answer the query. And in doing so, the result of the query is still accurate, since what is happening is that many, many ephemeral time series that are in the past and which do not affect the results given a query time range of "today" are simply not considered.

Note that the problems and example solutions described in this section do not rely on the fact that a query actually has an aggregation function. Often users simply want to see a display of the time series in question across all instances, without aggregation. Even though these displays can become very busy and lead to overplotting if there are many unique time series, in such a display it can be easily determined visually if any given time series behaves notably different from others. Therefore displaying the result of time series queries over sets of time series can still be useful, even if no aggregation is specified.

Metrics Rules (Metadata Synthesis and Modification)

As described above, machine data is received from various sources. Metrics data points are then generated that include elements such as key-value metadata pairs representing multi-dimensional metrics. However, different metrics sources may emit data in different formats which may not be consistent with the manner in which metadata is expressed in metrics data points of the system. For example, the metadata for received machine data may not necessarily be in the key-value pair format, where the keys for values are not explicitly expressed. As another example, while metadata from two different sources may be directed to what should be the same dimension, they may have different key names for the same dimension.

In some embodiments, metrics rules engine 144 is a processing stage (that may be user guided) that can change existing metadata or synthesize new metadata for each incoming data point. One example use case for this is in dealing with the format of metrics coming from the Graphite source. Graphite collapses a large amount of information into a simple dot-separated metric name. The information left in the metric name is then only the values of all the dimensions the user logically associates with the time series, but the key of the key-value pairs for those dimensions are elided and are not defined. For example, the dimensions or keys of the values in the dot-delimited format are not known or explicitly expressed. In this example, a metrics rule may be used to extract some or all of the segments of the dot-separated metric name of a Graphite data point and create key-value pairs based on a mapping. Thus, metrics rules engine 144 is configured to infer key-value pairs from received machine data, thereby translating machine data, which may be from various sources in various formats/conventions, into a canonicalized key-value pair form.

In one embodiment, the metrics rule engine performs the translation based on a specification or configuration of translation statements. A translation statement filters machine data based on a set of criteria (e.g., what is the source category, the metric name, or other information provided by the agent in a format/communication protocol known to the platform). If the machine data matches the filter criteria, then the metrics rules engine, according to the specification, addresses individual path segments of the received machine data. Key-value pairs are then generated from the information extracted from the individual path segments.

In some embodiments, a regular expression defined in the translation statement is used to obtain the information to generate the key-value pairs. In the example in which the source provides information in the Graphite format, the machine data is split by dot, and the information between dots is used to derive key-value pairs of a metrics data point.

Thus, the metrics engine translates the information in the received machine data into a different form (e.g., metric name and dimensions) to allow the machine data to be better indexed and queried.

The following is an example in which a metrics rule is used to synthesize new metadata from received machine data.

Suppose, for example, that the following metrics data point is received natively from the Graphite metrics data source:

Metric_name=Fidget.com.foo.csv.message_count

As shown, the name of the metric received from Graphite is a set of values in a dot-delimited or dot-separated format, where the field values are dot delimited, with no corresponding keys. The following example translation statement (metrics rule) is used to process the aforementioned data to infer an improved metric name and dimensions (e.g., keys) for the dot-delimited values:

```
If source_category=metric && metric name ends with ("message_count")
then
    metric_name = _3
    Seller = _1
    File = _2
```

In this example, because the Graphite data came in as a metric (its source category is "metric") and the data ends with message_count, the incoming data matches the "if" portion of the translation statement. The translation statement is then used to address the individual path segments of the received data and apply corresponding key names. In this case, the "metric_name" key is assigned to the "message_count" value in the Graphite data (which is in the third "_3" dot-delimited portion or segment. Thus, a new metric name has been synthesized for the metrics data point. The value in the first portion of the Graphite data (1) "fidget.com" is assigned the key "seller" and the value in the second portion of the Graphite data (_2 in the translation statement) "foo.csv" is assigned the key "file." In other embodiments, a regular expression (regex) is used to implement the translation (perform extraction of field values and perform corresponding key assignment).

Thus, three key-value pairs (metric_name=message_count; seller=fidget.com; file=foo.csv) have been inferred from the Graphite data using the translation statement, which did not natively include key names or dimensions for the values in between the dot delimited path segments. The newly generated key-value pairs are then included in the metrics data point. Thus, from the dot-delimited metric name natively received from Graphite, a new metric name and dimensions were generated. By doing so, the received metrics data can then be indexed for querying.

As another example use case, suppose that Alice has multiple teams working for her on DevOps. The different teams might obey different conventions about the dot delimited ordering. For example, one group might swap what the second dot delimited field means with the third delimited field. The two groups might be two different teams within the same company. Using the metrics rules engine, Alice can harmonize the machine data in different formats from the different teams into a canonical form based on the metrics rules configuration, where separate translation statements are specified for the two different teams. The separate translation statements will process the machine data from the two groups differently, but ultimately generate key names or dimensions that are consistent across both groups. For example, one team might call one dimension by the key name "dep," while the other team calls the same dimension by a different name "deploy." Different translation statements for the two different teams can identify the values from the two differently named dimensions, and when generating key-value pairs, assign the values the same canonical key-name or dimension, "deploy." This allows after-the-fact harmonization/normalization of metadata.

Further, by harmonizing in the manner described above, even though the machine data from the two different teams came in different conventions, because they have been canonicalized as described above, the identification of what time series to add metrics data points to can be consistently determined. Thus, the machine data from the two different groups may be added to the same time series, even if the conventions of the raw machine data were different, because of the canonicalization and harmonization of the key-value pairs. In addition to harmonization, existing keys may also be rewritten or otherwise modified. Thus, a consistent view of the machine data is generated, despite the machine data being received in disparate formats and conventions.

Figure 5:
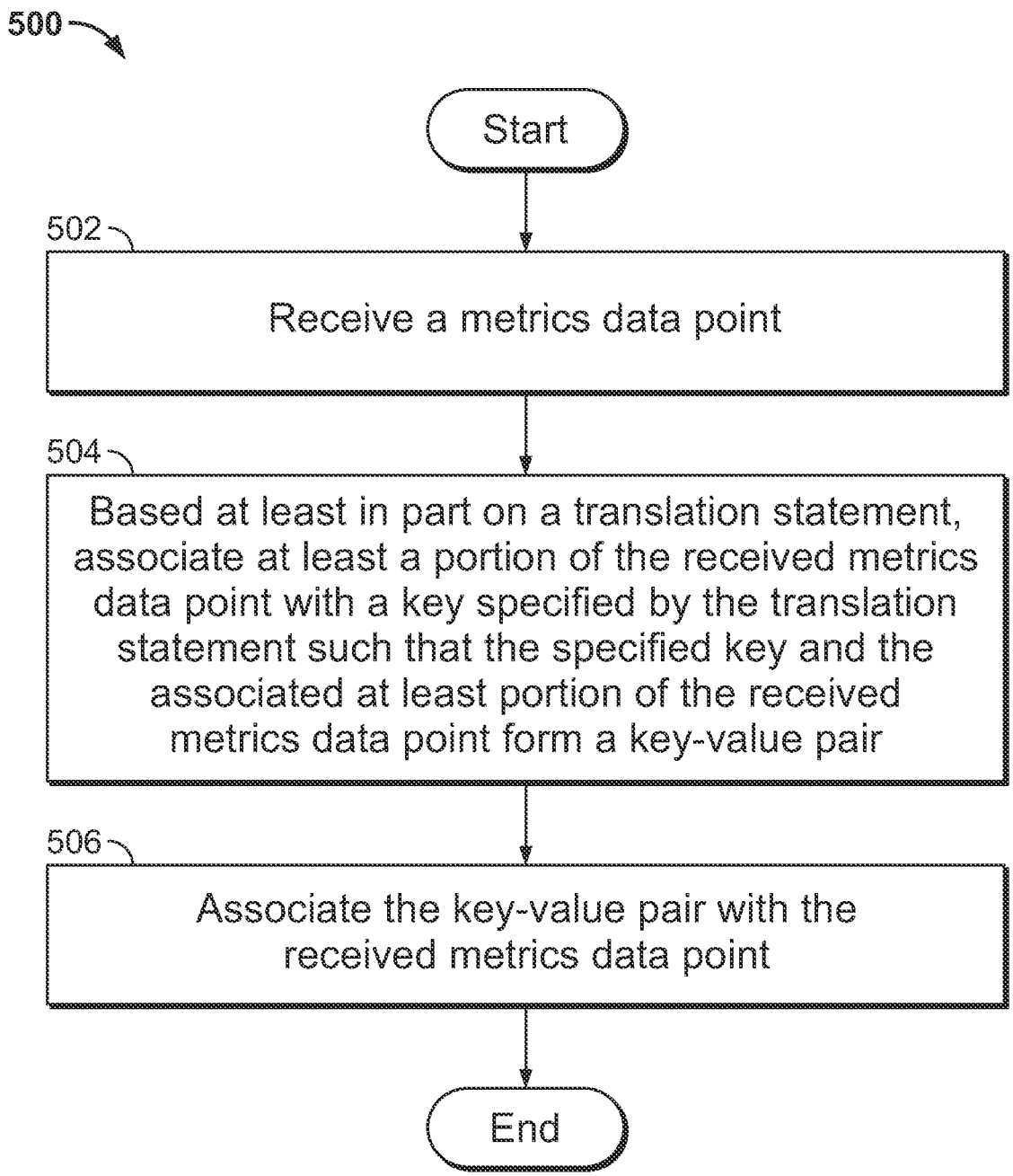
FIG. 5 is a flow diagram illustrating an embodiment of a process for key name synthesis.

FIG. 5 is a flow diagram illustrating an embodiment of a process for key name synthesis. In some embodiments, process 500 is executed by metrics rules engine 144 of platform 102 of FIG. 1. The process begins at 502 when a metrics data point is received. For example, the received metrics data point is an incoming data point obtained from a remote device. The incoming data point may be received in a format such as the Graphite protocol (e.g., in a dot-delimited format). The incoming data point may also include metadata in key-value pairs.

At 504, based at least in part on a translation statement, at least a portion of the received metrics data point is associated with a key specified by the translation statement such that the determined key and the associated at least portion of the metrics data point form a key-value pair. For example, the received metrics data point is evaluated against the filtering criteria or condition of one or more translation statements. If the received metrics data point matches the filtering criteria of a translation statement, then the received metrics data point is translated according to the matched translation statement.

The matched translation statement is used to map portions of the received or incoming metrics data point to dimensions or key names, thereby forming new keys/dimensions or modifying existing metadata keys in the received data point. For example, in the Graphite protocol example, the translation statement extracts (e.g., using a regular expression) values from individual path segments (values in between dots in the dot-delimited Graphite format) and maps the extracted values to dimensions/keys, forming or synthesizing new key-value pairs. As another example, if the incoming data point includes key-value pairs, the translation statement may include a configuration that takes (e.g., extracts) the value for an existing dimension in the received data point and assigns the value to a new dimension, thereby modifying an existing metadata key/dimension.

At 506, the key-value pair is associated with the metrics data point. For example, a synthesized key-value pair is added to the metrics data point, or an existing key-value pair is replaced with its modified version (e.g., existing value with new key).

In some embodiments, subsequent to associating the key-value pair with the metrics data point, the metrics data point is further processed. For example, the metrics processing performed at 206 is performed. As another example, the key-value pair associated with the metrics data point at 506 is used to identify a time series to which to insert the modified metrics data point, as described, for example, at step 408 of FIG. 4. A metadata catalog may also be updated.

Metadata Enrichment/Augmentation

Further example details regarding the further augmentation above include the following: after having received a log message or a data point, information in the log message or the data point metadata may be used to look up or match additional information which can then be attached to the log message or the metrics data point. For example, for a log message, a parse statement can be used to extract an Internet Protocol (IP) address. The extracted IP address can then be used to look up reputation information for that IP address, for example from commonly available threat intelligence databases (which may be integrated and available to all customers of the platform). In some embodiments, the lookup produces additional key-value pairs that can be attached to the log message, just like extracted fields. For example, from the reputation data, using the extracted IP address as an indicator of compromise, a field "malware_type" can be added to the log message, for example with value of "remote_access_tool," along with field "severity" with value of "high."

Other programmatic augmentation or enrichment logic is supported by the data processing and analysis platform described herein. As one example, metadata present in a log message or a metrics data point is used to look up additional metadata from cloud services. Such enrichment may be performed in cases where certain information may not even be available whatsoever at the original collection/instrumentation site. In one embodiment, the data processing and analysis platform is configured to join together two distinct (but related) pieces of information to enrich the data point into a more useful final product. This is more efficient, for example, than for a customer of the platform to do the enrichment themselves prior to sending the data to the platform, as this would be complex and difficult for the customer to do. One example for performing such enrichment is to allow collector software to locally look up the AWS instance ID of the virtual machine instance the collector is actually installed and running on. With the identity of the AWS instance, the AWS Application Programming Interface (API) allows querying the "tags" associated with the instance. "Tags" in AWS are yet another incarnation of dimensional key-value pairs. Using this process, the AWS tags for the instance can be synced down to the log message (e.g., using logs enrichment engine 130 of platform 102) or the metrics data point (e.g., using data point enrichment engine 146 of platform 102), where they become metadata, expressed as fields, where the name of the field is the AWS tag key, and the value is the AWS tag value. In the example of FIG. 1, logs enrichment engine 130 and data point enrichment engine 146 of platform 102 are shown as separate enrichment engines. In other embodiments, there is a single enrichment engine (e.g., integrated as a portion of receiver 108) which is configured to perform metadata enrichment of incoming/ingest log messages and data points that are received by receiver 108.

In some embodiments, data point enrichment engine 146 and logs enrichment engine 130 are configured to communicate with metadata collection engine 148 in order to obtain, from a remote entity such as third party service supplier 150, additional data to enrich metrics data points and log messages, respectively. Thus, using the techniques described herein, log messages and metrics data points (whether native or synthesized from log messages) may be enriched with metadata obtained from external sources.

The following is an example of enriching machine data with AWS tags. Suppose, for example, that the fidget spinner warehouse service runs on a cloud, such as Amazon Web Services (AWS). For example, the service is running on an EC2 instance.

In the above example, machine data was received via an agent installed on a client device. In other embodiments, machine data such as metrics is ingested by the system via a third-party integration. In this example, in which a portion of the service is running on AWS (e.g., third party service supplier 150 of FIG. 1), Alice provides platform 102 with credentials to fetch, on Alice's behalf, metrics about the fidget spinner's AWS account and the machines that are set up in AWS. In some embodiments, partial credentials are used to fetch the additional information. For example "AWS-IAM" are credentials that would allow the platform only partial access to the AWS accounts and information of the customer. This would allow the platform to retrieve metrics data as well as enriching metadata, but would prevent the platform from accessing more sensitive information, changing the customer's AWS configurations, etc. The metrics are then ingested and processed by platform 102. Integrations may be made with various other third parties, such as Google Cloud, Azure, Box, Dropbox, and Microsoft 365 Live.

The third-party integration may be used to obtain AWS specific information, such as information about a host or a cluster that the host runs on, or other infrastructural information. This may include information associated with AWS's own services that cannot be obtained, for example, by an agent such as agent 104 stored on a host such as host customer machine 106. In this example, the third-party integration is used to obtain tags. The tags may be associated with information specific to AWS's own services such as AWS quota size, rewrite capacities in Dynamo, etc.

Using metadata collection engine 148 and either logs or data point enrichment engines 130 or 146 (depending on whether log messages or metrics data points are being enhanced), the collector can interrogate AWS and obtain the identifier of the instance on which the fidget spinner service is running. The enrichment engines are configured to attach such metadata (obtained as tags) to host metrics.

For example, the partial credentials from Alice are used to access the AWS API, where such AWS tags can be pulled. The tags are a capability in AWS where metadata is associated with resources in AWS. Another example of an AWS tag is one specifying the region of the United States in which the instance is running. Another example of an AWS tag is one that specifies instance type (e.g., is the instance a graphics processing unit (GPU), field-programmable gate array (FPGA), CPU, etc.). Yet another example of a tag is one that indicates whether the instance deployment is in production (e.g., a production server) or a staging server (e.g., a test server). Developers may use these tags for various actions such as automated rollout and provisioning and control of AWS resources.

The following are examples of AWS tags that may be received, as well as examples of how these tags may be used:
Deployment=Production vs Deployment=Staging
CostCenter=IT vs CostCenter=Engineering (e.g., for ensuring AWS costs are properly attributed to different parts of the organization)
SoftwareVersion=A vs SoftwareVersion=B (e.g., for testing or partially rolling out different versions of the software in production)

Using fidget spinner's partial credentials, such tags are pulled down and joined with their metrics data point, for example, based on an instance type identifier that was attached to a native metric that was ingested by the platform. For example, the agent 104 may send up metrics with the instance type identifier attached. Using the instance type identifier attached to the machine data and the partial credentials, a set of third-party key-value pairs may be obtained, and then joined at ingestion time to enrich a metrics data point, after which the enriched metrics data point is stored using metrics processing engine 114. In this example, third party metadata was used to enrich a metrics data point generated from information provided by a host system by joining on an instance identifier. Any other fields may be used to allow the performing of the join (e.g., on a foreign key) to enrich metrics data points. Enrichment of logs may also be performed. Thus, as shown in this example, information in an obtained host metric may be used as foreign keys into a third party data source to obtain additional information that is used to enrich a metrics data point by joining on the foreign keys. In some embodiments, the joining includes adding key-value pairs to a metrics data point.

Thus, as described above, a metrics data point generated using the techniques described above may be enriched with third-party metadata from an external remote source. As one example, an AWS API is accessed to obtain tags with which to enrich the metadata of a metrics data point. Thus, during the transformation step (of the log to a metrics data point), external information that was not present in the original log message may be leveraged. In some embodiments, the external information is obtained using information that is present in the external log message. For example, external information is obtained using data extracted from the log message from which the metrics data point was synthesized. In some embodiments, the obtained additional information is joined to the metrics data point or log message using foreign keys. One example scenario for joining AWS tags to metrics data points using foreign keys is to use the AWS EC2 instance IE (e.g., i-1234567890abcdef0) as the key—it can be collected locally and associated with metrics data points, then joined later (e.g., server/backend side) against AWS tags that are retrieved via an API.

Figure 6:
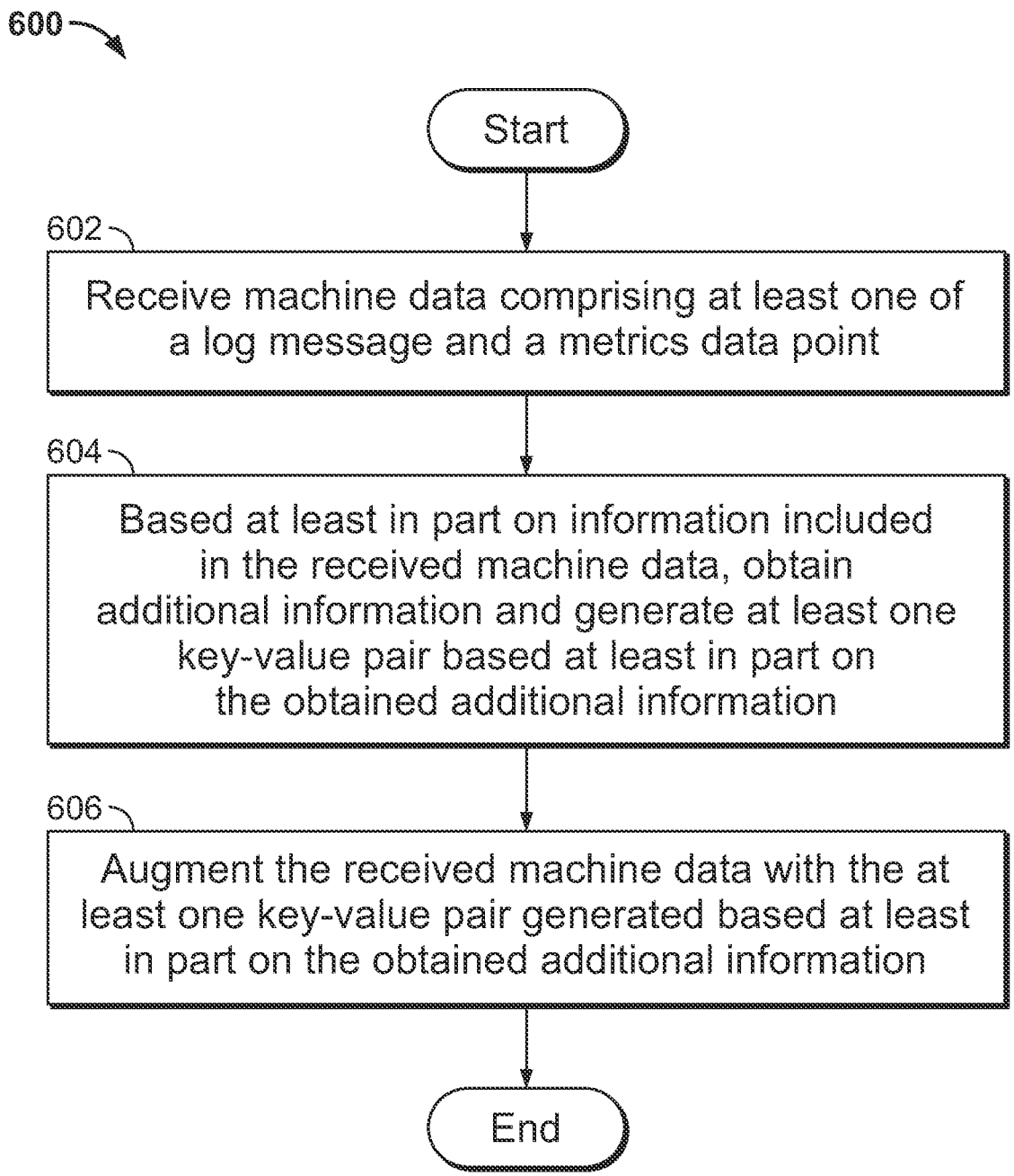
FIG. 6 is a flow diagram illustrating an embodiment of a process for enrichment of machine data.

FIG. 6 is a flow diagram illustrating an embodiment of a process for enrichment of machine data. In some embodiments, process 600 is executed by data point enrichment engine 146 and/or logs enrichment engine 130 in conjunction with metadata collection engine 148 of platform 102 of FIG. 1. The process begins at 602 when machine data comprising at least one of a log message and a metrics data point is received.

At 604, based at least in part on information included in the received machine data, additional information is obtained. A key-value pair is generated based at least in part on the obtained additional information. As one example, metadata information present in the log message or metrics data point is used to look up or match additional metadata information. The additional metadata may be obtained from an external third party source or an integrated database. The obtained metadata is expressed as key-value pairs.

At 606, the machine data received at 602 is enriched or otherwise augmented with the key-value pair generated based at least in part on the additional information obtained at 604. For example, the generated key-value pair is attached as metadata to a log message or metrics data point.

In some embodiments, the enriched or augmented at least one of the log message and metrics data point is further processed. For example, the log message may be further processed by logs processing engine 124 to determine whether the log message should be translated into a metrics data point. As another example, the metrics data point may be further processed by metrics processing engine 114. For example, the generated key-value pair attached to the metrics data point is used to identify a time series in which to insert the generated key-value pair (e.g., as described at 408 of FIG. 4). A metadata catalog may also be updated.

Example Interfaces

In the example of FIG. 1, a log message is received, and a set of metrics data points is constructed from the log message. The sets of metrics data points are then added to identified time series. In addition, a metadata catalog/index is updated based on the constructed metrics data points. The metadata catalog facilitates efficient querying of the metric and time series information.

As described above, the metadata for the time series and data points is specified as key-value pairs in the metadata catalog (even though the machine data may not have information in this form natively).

When Alice queries the time series (e.g., via a dashboard), she types into a field the various dimensions that she is interested in, such as customer ids, regions, etc. These are used as key values into the metadata catalog to identify relevant metrics and time series. Below are example interfaces for querying log and metrics data. In some embodiments, the interfaces are provided by query engine 152.

Figure 7:
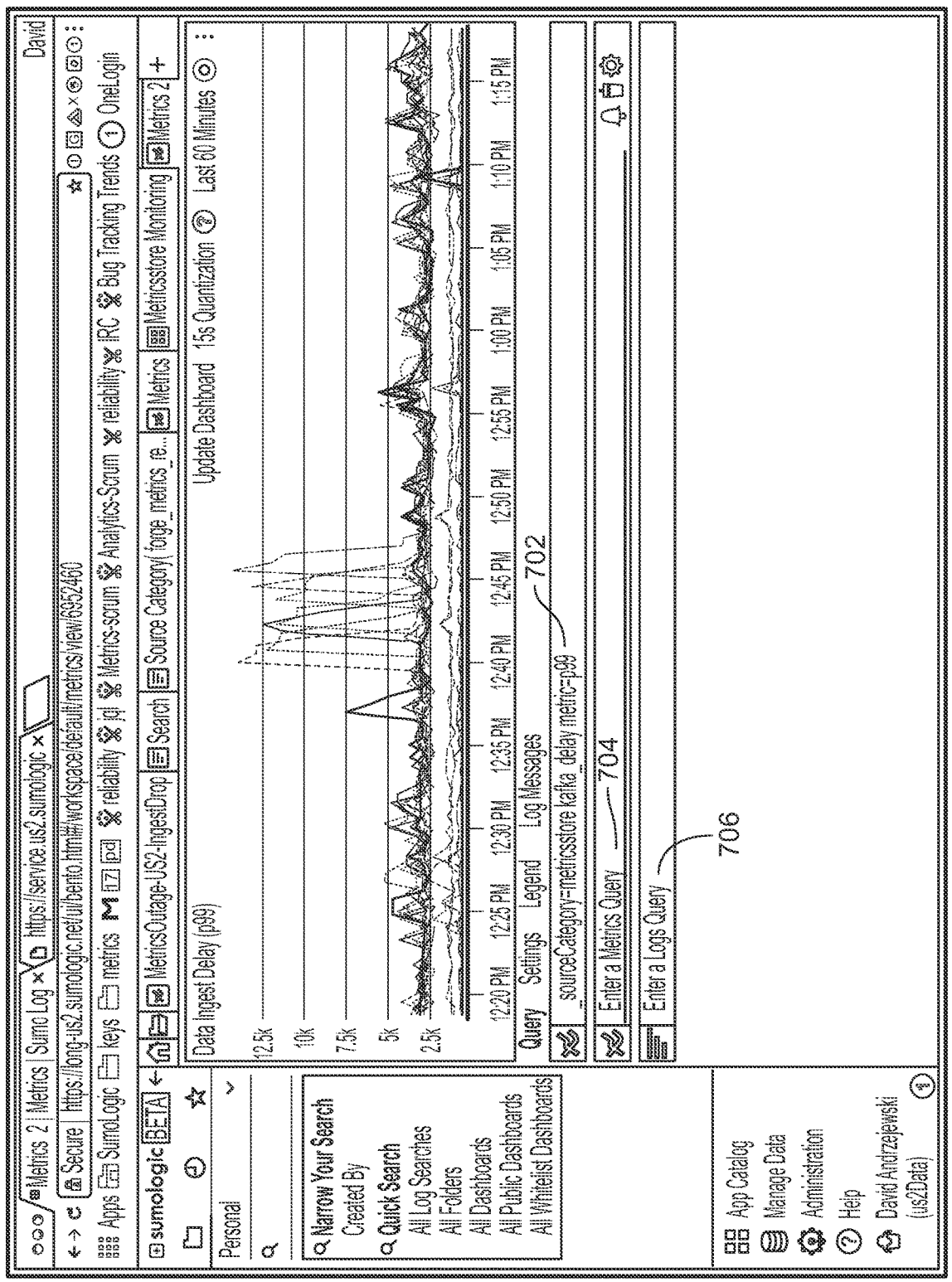
FIG. 7 illustrates an embodiment of an interface for querying for time series.

FIG. 7 illustrates an embodiment of an interface for querying for time series. In this example, suppose that Alice is interested in a metric related to the delay with which customer data is being processed. Alice uses the example dashboard of FIG. 7 to perform a query.

As shown in this example, at 702, the user, such as Alice, queries for a time series. In this example, suppose that Alice enters a query with the key values "_sourceCategory=metricsstore" and "kafka_delay metric=p99." Shown also in this dashboard are fields for entering metrics queries 704 and logs queries 706.

Figure 8:
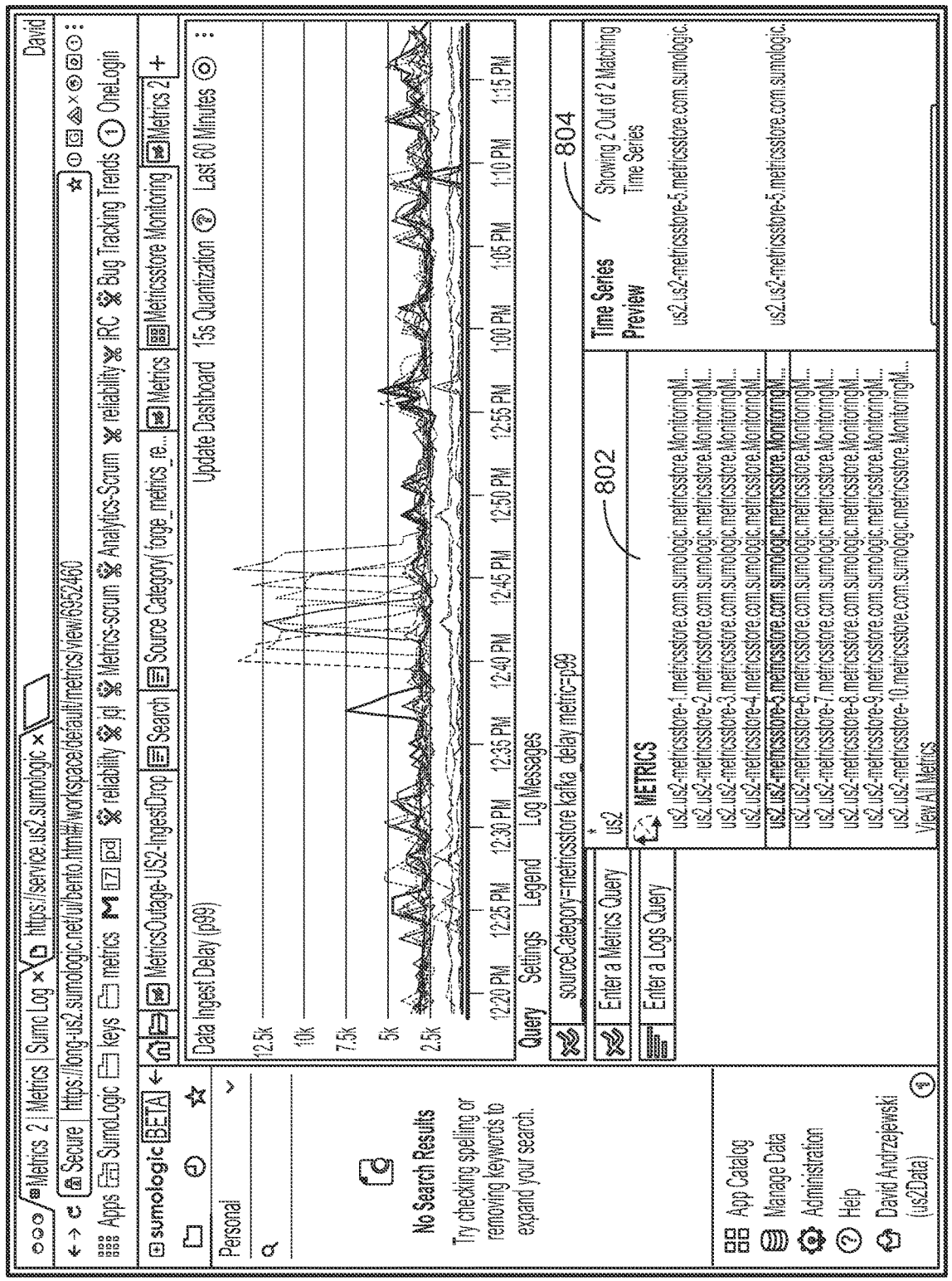
FIG. 8 illustrates an embodiment of an interface for querying for time series.

FIG. 8 illustrates an embodiment of an interface for querying for time series. Continuing with the example of FIG. 7, as shown in FIG. 8, in response to the queried-for key values, the dashboard is updated at 802 with the metrics maintained by platform 102 that have metadata matching the queried for key values. Also shown at 804, in dot delimited format, is the set of time series that match these key-value pairs (in this example, multiple time series may have associated metadata that match to the queried-for key values).

The metrics and time series shown at 802 and 804 are determined by platform 102 using metadata catalog 142. For example, the queried-for key values are used to access the metadata catalog and return the names of the matching metrics. From those matching metrics, the time series that include those metrics are also obtained and displayed.

In some embodiments, subsets of the metrics/time series that match the query are displayed (and the user can scroll down to view all of the matching metrics/time series).

Previews of time series that match the key values queried for by Alice are displayed graphically at 804, where each line corresponds to a time series (e.g., table in the time series database 122), where each time series is in a row in the metadata catalog that includes a link (or a link is generated from some of the metadata) to the time series.

Figure 9:
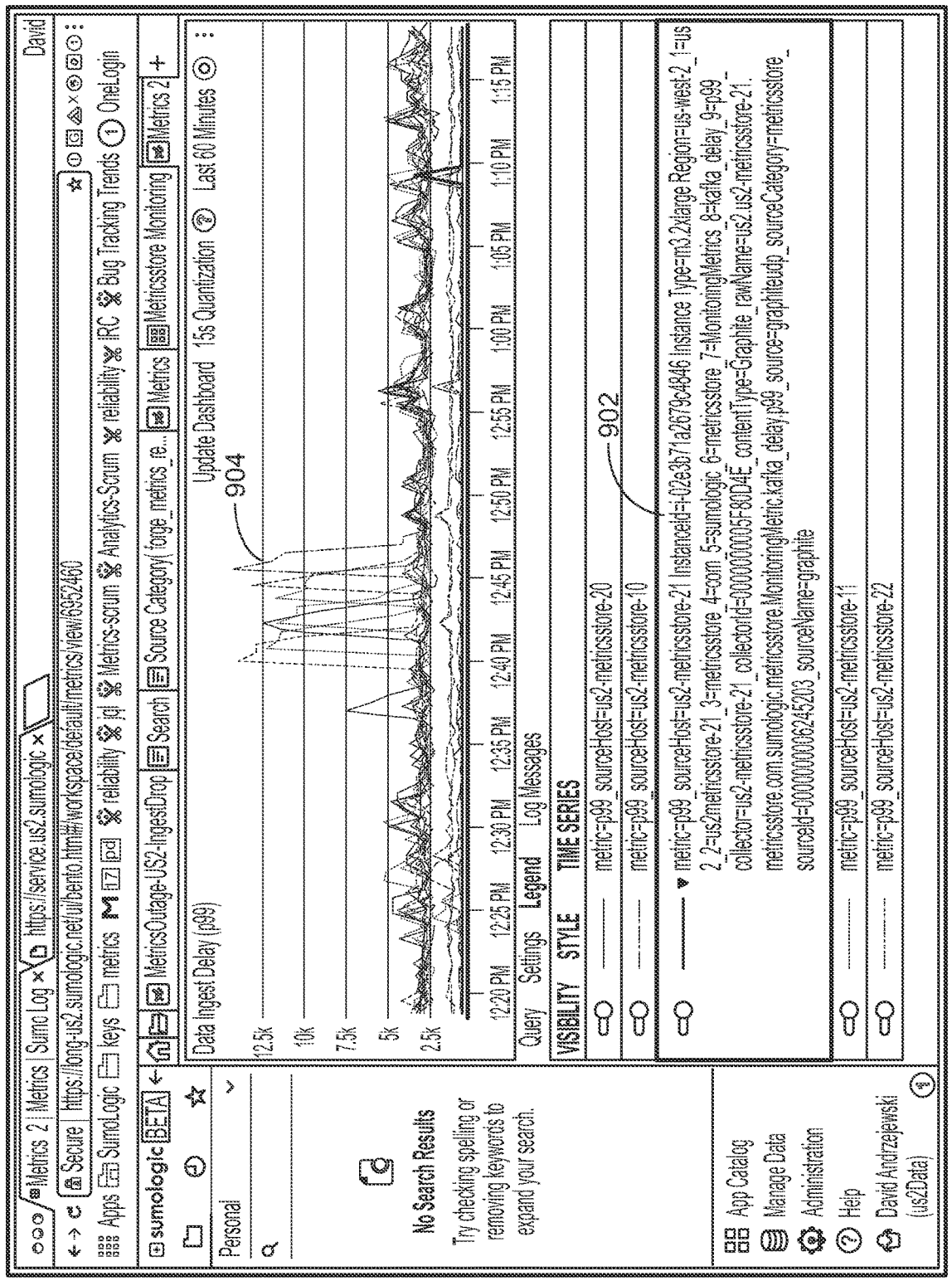
FIG. 9 illustrates an embodiment of an interface for querying for time series.

FIG. 9 illustrates an embodiment of an interface for querying for time series. In the example dashboard of FIG. 9, Alice highlights a time series 902 which, as seen at portion 904 of the interface of FIG. 9, has spikes in the plot of data ingest delay over time that appear approximately between 12:35 pm-12:50 pm.

Figure 10:
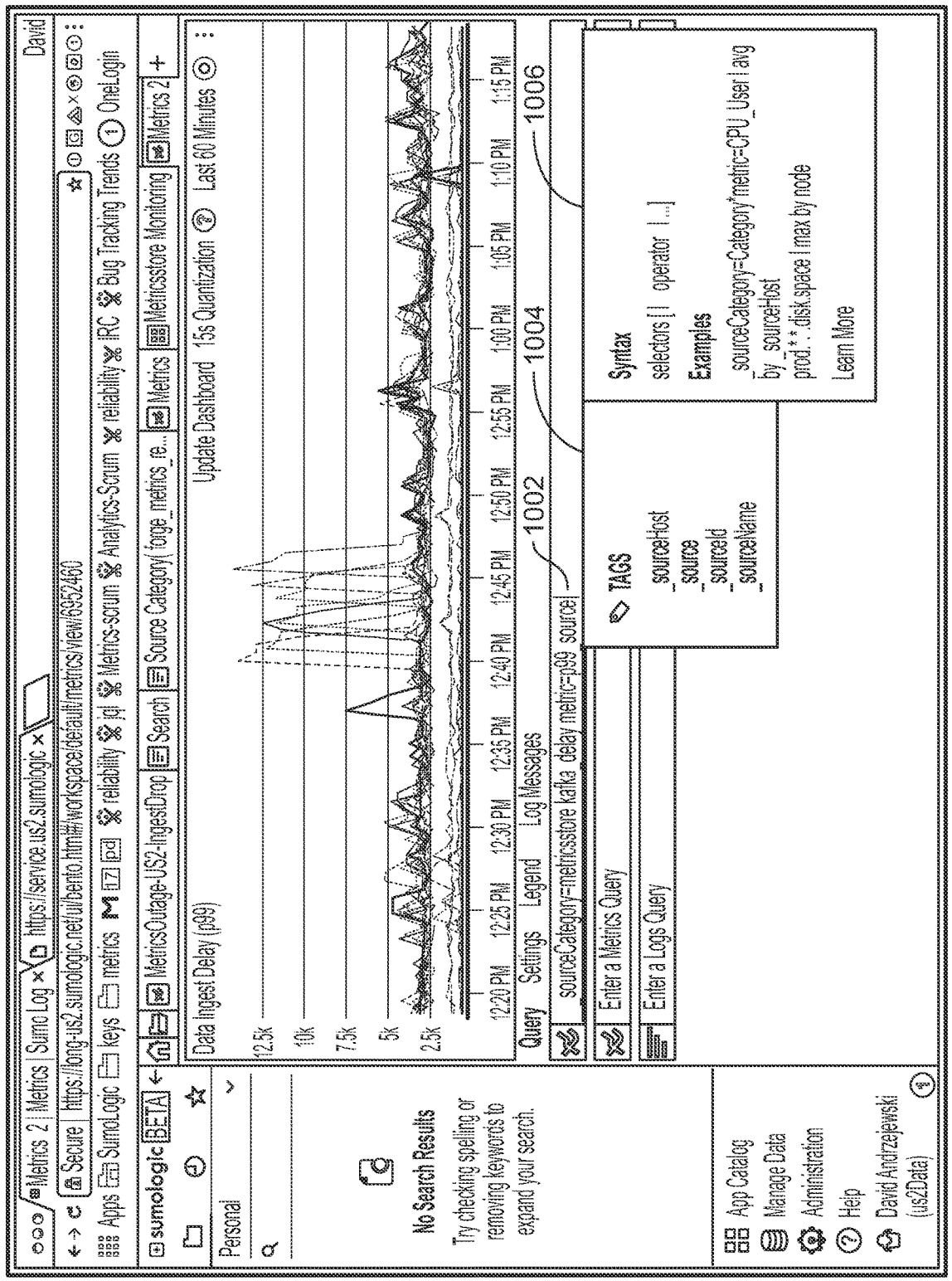
FIG. 10 illustrates an embodiment of an interface for displaying autocomplete suggestions.

FIG. 10 illustrates an embodiment of an interface for displaying autocomplete suggestions. In this example, Alice has so far typed in "_source" at 1002. Displayed at 1004 are the possible keys (tags) that begin with the portion of text that Alice has typed so far at 1002. Further examples and information associated with keys are shown at 1006. In some embodiments, the possible keys are obtained based on a lookup of metadata catalog 142.

Figure 11:
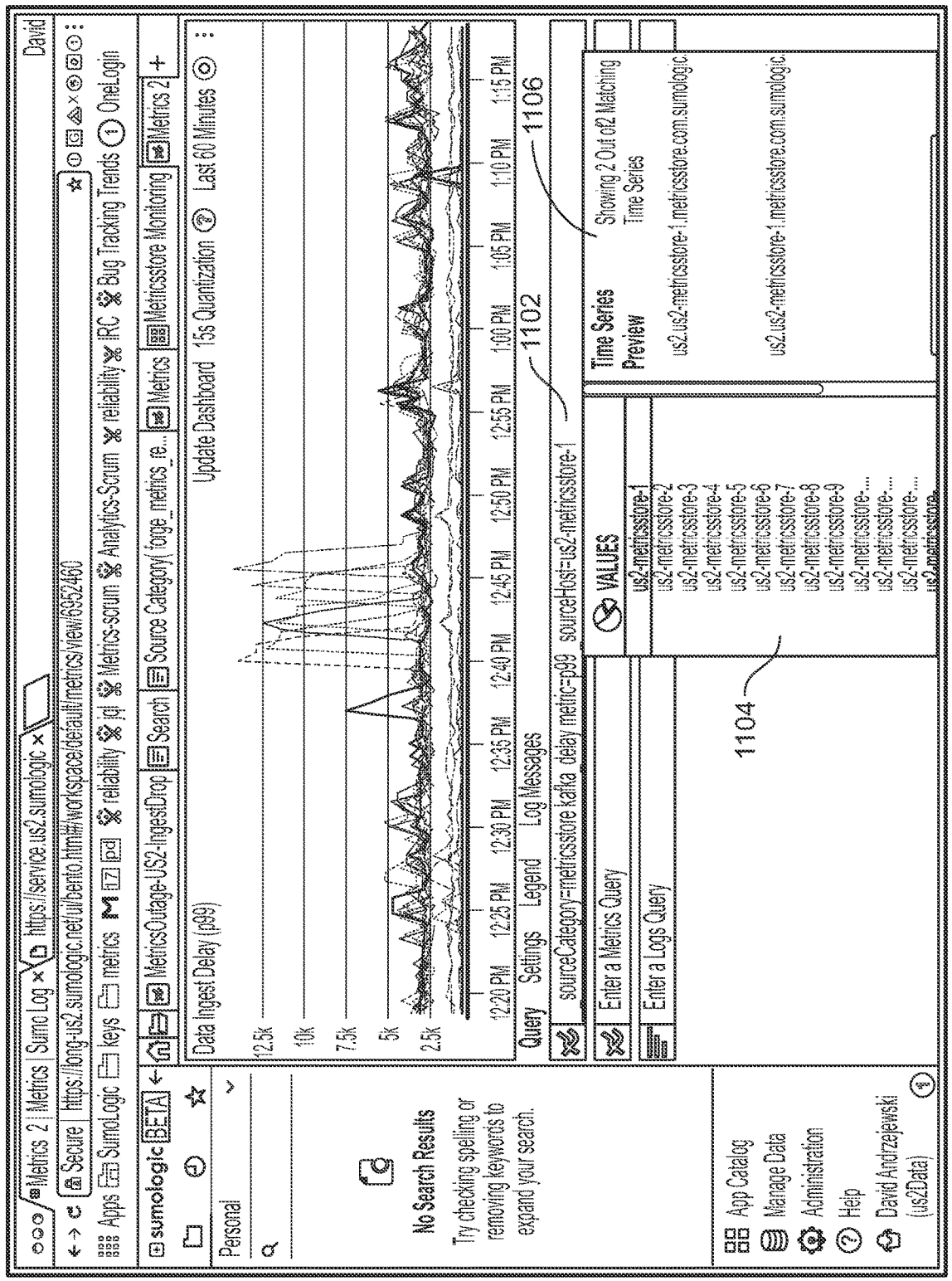
FIG. 11 illustrates an embodiment of an interface for displaying autocomplete suggestions.

FIG. 11 illustrates an embodiment of an interface for displaying autocomplete suggestions. Suppose that in the example of FIG. 10, Alice has selected to complete the key "_sourceHost," as shown at 1102. Based on the key "_sourceHost," possible values for the key are shown at 1104. In some embodiments, the possible values are also obtained from metadata catalog 142, which provides the values stored for the dimension. Alice decides to narrow down her key value to one particular host, "us2-metricsstore-1." Displayed at 1106 are the time series for the combination of key values specified by Alice in her query (_sourceCategory=metricsstore kafka_delay metric=p99_sourceHost=us2-metricsstore-1). In some embodiments, the list of possible source hosts displayed in the dashboard to perform the metadata completion is cached in a data store such as a Redis cache.

Figure 12:
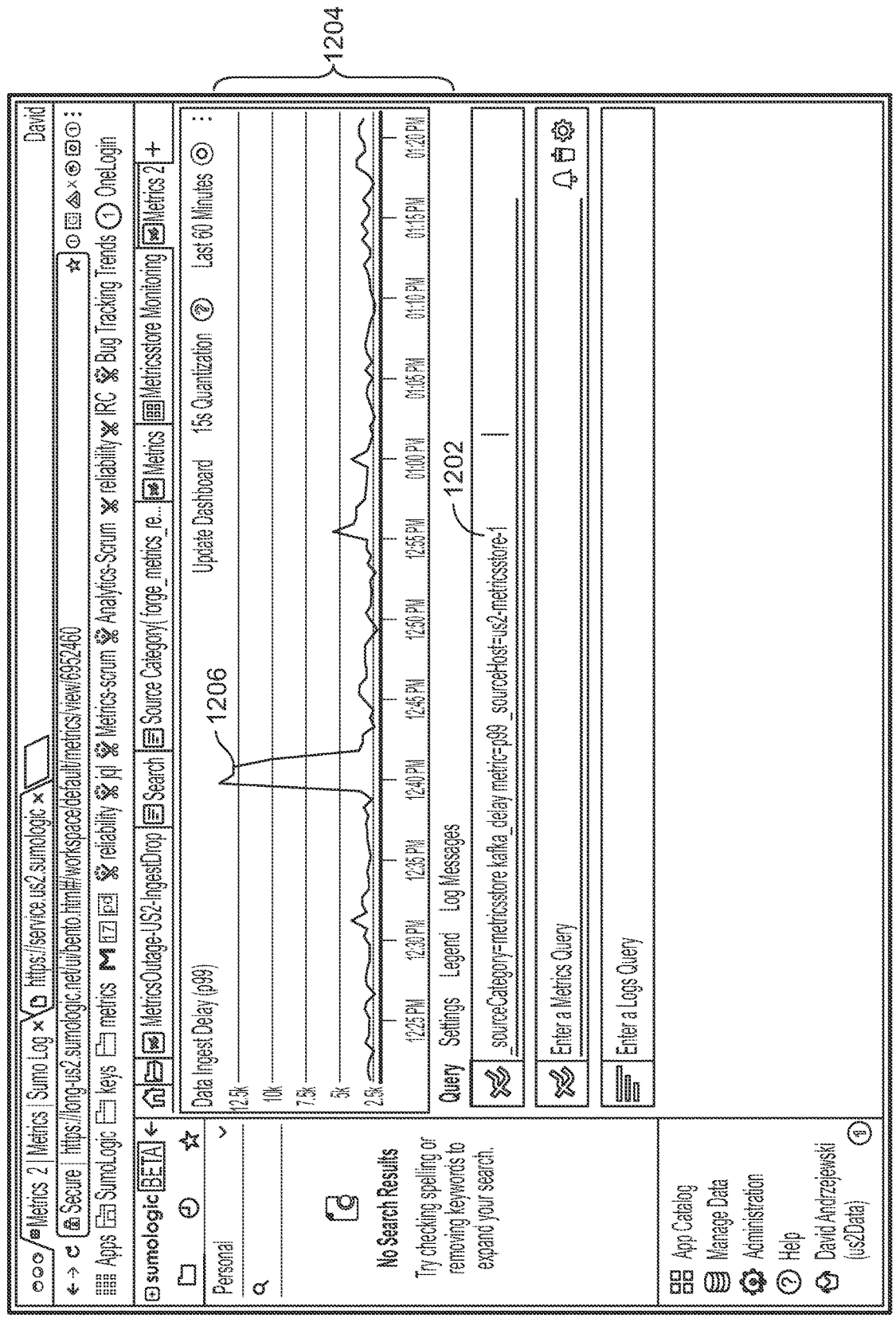
FIG. 12 illustrates an embodiment of an interface for displaying a time series.

FIG. 12 illustrates an embodiment of an interface for displaying a time series. Continuing with the example of FIG. 11, after Alice has selected the value "us2-metricsstore-1" for the key "_sourceHost," the time series corresponding to her complete query of key-value pairs at 1202 (_sourceCategory=metricsstore kafka_delay metric=99_sourceHost=us2-metricsstore-1) is displayed at portion 1204 of the interface. In some embodiments, the key-value pairs are used to access the metadata catalog index to identify the time series whose metadata matches the queried-for key-value pairs. A spike (1206) in the time series is shown.

Figure 13:
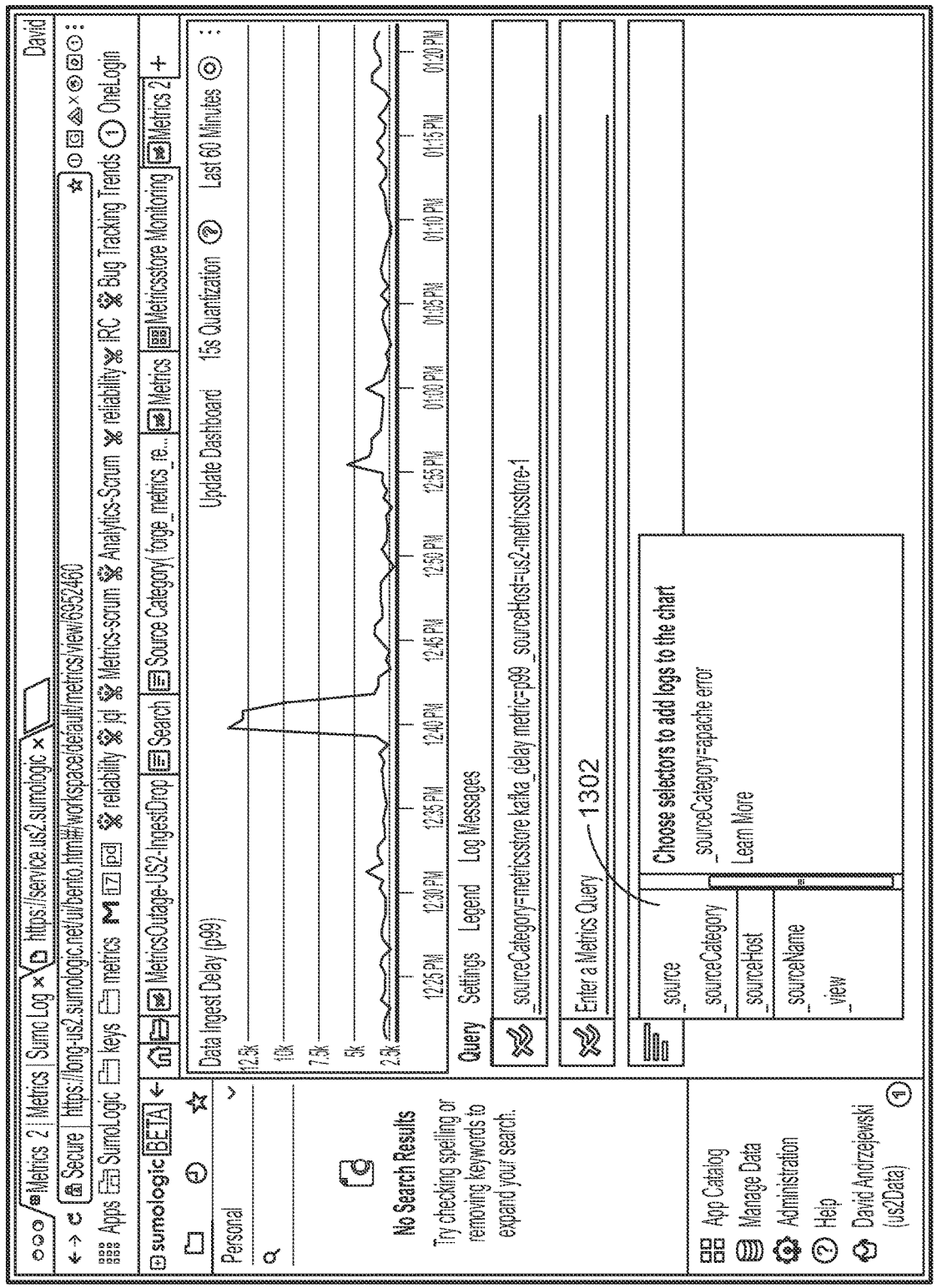
FIG. 13 illustrates an embodiment of a query interface for choosing selectors to add logs to a chart.

FIG. 13 illustrates an embodiment of a query interface for choosing selectors to add logs to a chart. In this example, Alice would like to further investigate why there was a spike in the time series for the delay metric on the selected host (as shown at 1206 of FIG. 12). Alice hypothesizes that there was a restart of the host at around lunch time. She would like to see the raw logs corresponding to the point in time of the spike. In order to do so, as shown in the example dashboard of FIG. 13, Alice performs a log query (1302), which queries the log backend for the raw logs corresponding to the same host specified in the time series query (which would be specified as part of the same key-value pair). In this example dashboard, Alice is presented with various options for keys at 1302.

Figure 14:
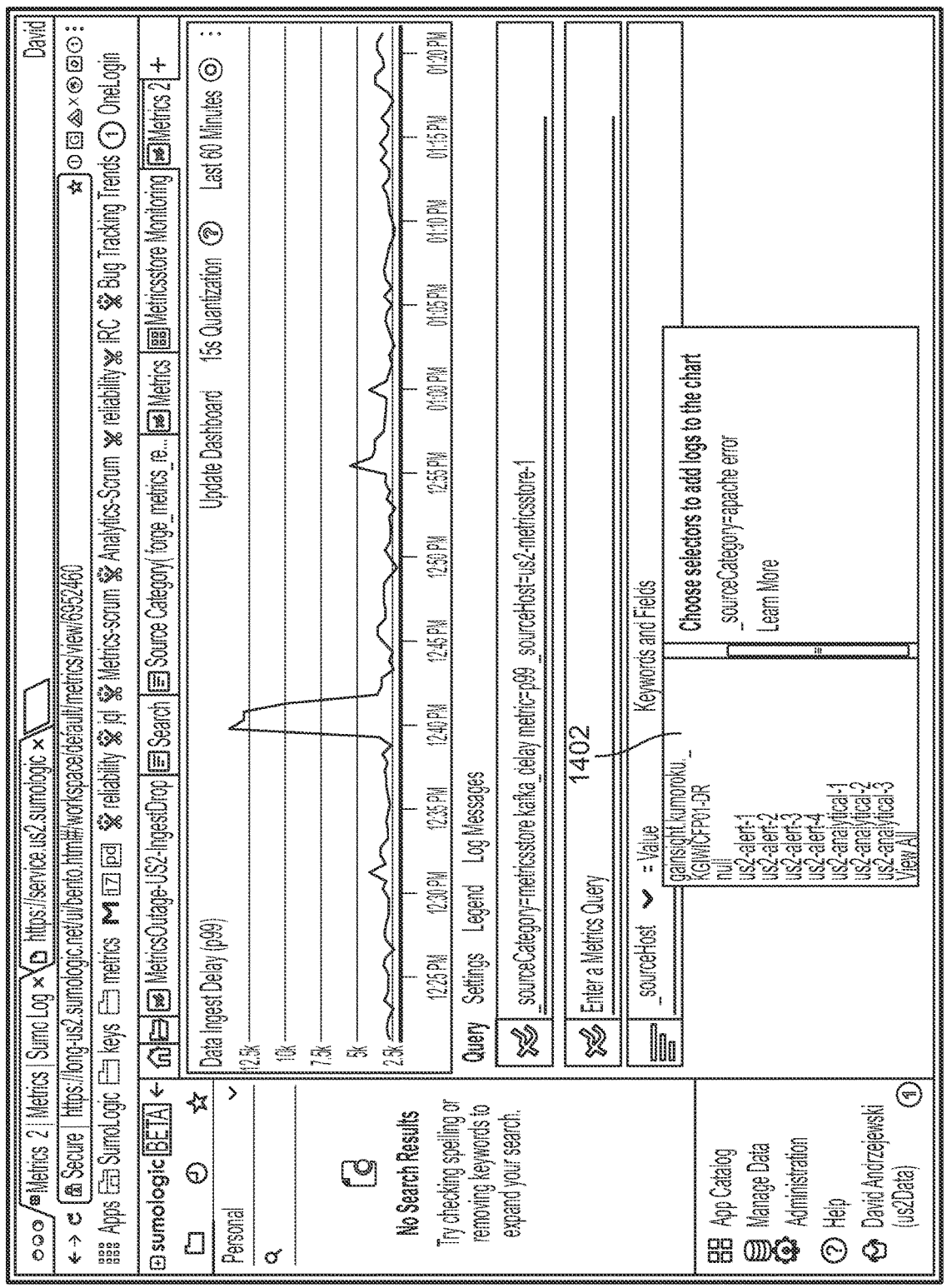
FIG. 14 illustrates an embodiment of a query interface for choosing selectors to add logs to a chart.

FIG. 14 illustrates an embodiment of a query interface for choosing selectors to add logs to a chart. Continuing with the example of FIG. 13, Alice has selected the key "_sourceHost" for her query. Based on her selection of the key "_sourceHost," platform 102 also provides corresponding candidate values for the key "_sourceHost," as shown at 1402. In some embodiments, the logs that are searched for are those logs from which the time series data points were derived, which may be obtained, for example, based on the log message identifier being added as metadata to the time series data points.

Figure 15:
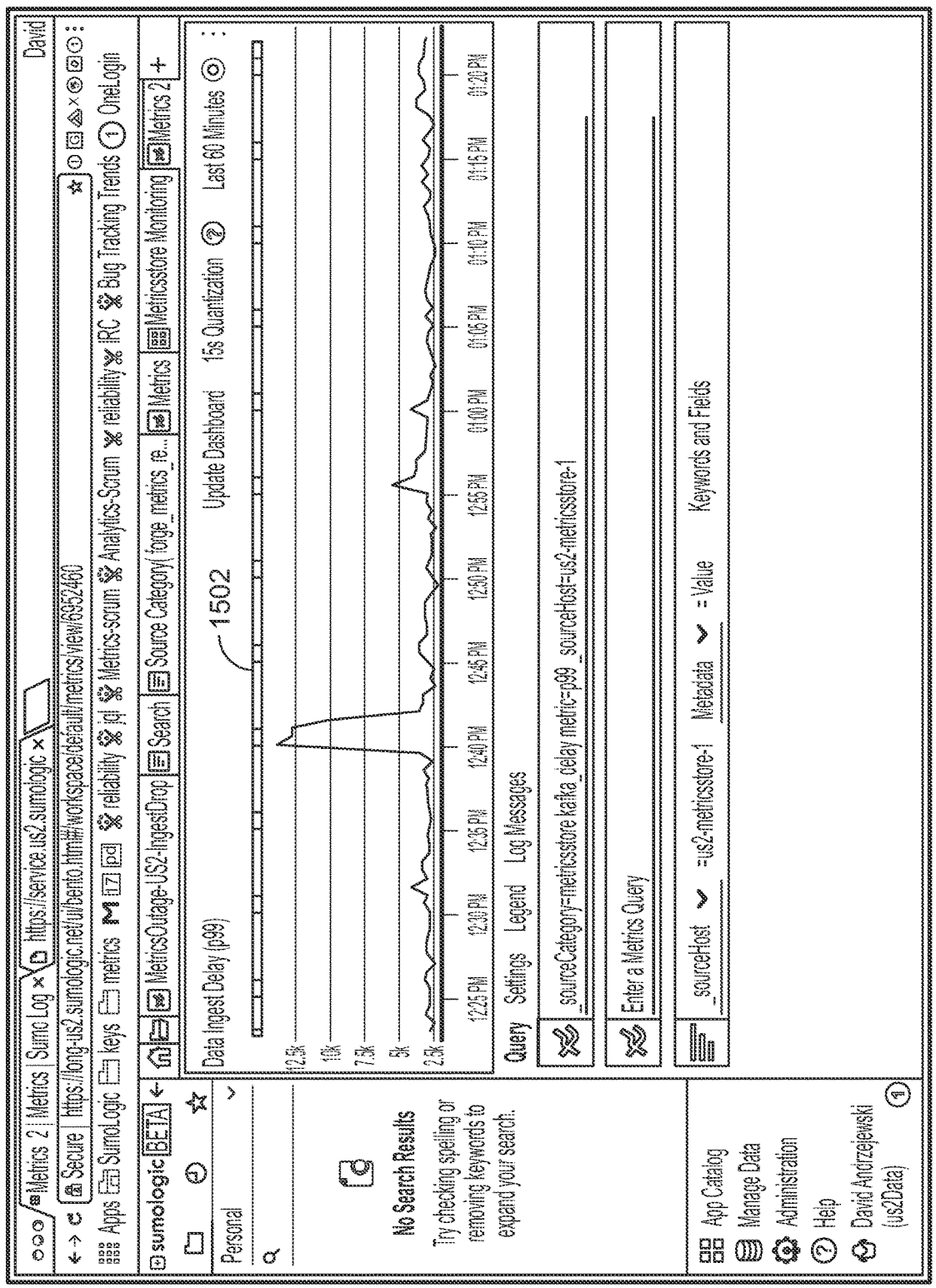
FIG. 15 illustrates an embodiment of a query interface.

FIG. 15 illustrates an embodiment of a query interface. Given the time series and log queries specified by Alice, as shown in the example of FIG. 15, the time series metrics and the corresponding raw logs are displayed, overlayed, in the same user interface (UI), as shown at 1502. In particular, a heat map or intensity plot of how many logs there are at a given time is shown. As one example, the intensity plot is performed by bucketing the raw logs into buckets of (adjustable) time intervals (e.g., one minute buckets or five minute buckets). For each bucket, a count is performed to determine the number of logs in the bucket. The intensity for the bucket is dependent on the determined number of logs (e.g., the color for the bucket of time becomes more intense the more logs there are in the bucket). The count of logs in the temporal buckets is one example of rolling up logs. Other rollups or aggregations with different time slices may be determined. Further details regarding overlay displays are described below.

As shown in this example, the results from the log search and a metrics search or query are visually merged in the user interface (UI). In some embodiments, the logs corresponding to the time series are identified using the log message identifiers attached to the metrics data points included in the time series, where the log message identifiers are used to automatically or programmatically identify the log messages from which the metrics data points in the time series were derived.

Thus, by viewing both the time series metric and the associated raw logs at the same time in the same UI, Alice can quickly understand why the spike occurred.

Overlay Display

A data collection and analysis system such as that described herein that has the capability of processing both logs and time series metrics provides the ability to create displays that combine information from both types of data visually (e.g., as shown in the example interface of FIG. 15). Such a system can also exploit the common metadata underlying both types of data in order to provide unique guided navigation as a differentiator to its users. As one example, suppose the user has been using the metrics UI to create time series display based on queries against the time it takes to process page requests in a front end cluster. In this example, the user is looking at the 99th percentile page load response time across all instances ("machines", "hosts") in the "frontend" cluster for the last 3 hours. The user notices that as of 10 minutes ago, the 99th percentile for this metric has suddenly spiked. The user then disaggregates the display by removing the aggregation function and is now presented with a visualization of the page load response times across all instances of the cluster, from which it is easily observable that only one specific front end instance shows a spike in page load response times.

In this example, the user is now trying to figure out why this one instance's performance has apparently gotten so much worse. In order to do so, the user wants to see more details of what the instance is doing. This may be achieved by looking at the logs of the application that saves the page load requests. The user could now manually go into the log search interface of the log management system and figure out how to find the logs for that specific instance. Since the system has the same underlying metadata for both logs and metrics, the logs coming from that same instance have the same _instanceID value as the time series being displayed. Therefore an action may be presented or otherwise made available to the user, for example when hovering over the misbehaving time series, that brings them directly to the logs of that instance—which, for example, is implemented as a log search predicated on the metadata field instanceID, where the value of instanceID is set to the same value as the time series for which the action was offered. This scenario need not be limited to just a single time series; the system may also allow the user to select multiple time series, either in the visualization display or in the accompanying legend that lists all display time series. Also, the user may also be queried for additional metadata to be considered when creating the log search that behind the scenes pulls the logs messages. Furthermore, the user may also specify additional log search terms. The user might, for example, have a hunch that perhaps the application has slowed down because it is close to running out of memory, in which case the user might want to search for term "garbage collection" or equivalent when drilling down from the time series visualization.

Another way of providing differentiated functionality in a system that combines logs and time series metrics in the manner described herein is to allow the user to overlay information from logs in time series displays. There are multiple different ways of doing this which will be discussed in turn. One example way to overlay information from logs in time series displays is to allow users to specify, along with the metrics query, one or more additional log queries. The log queries in this case will be non-aggregating. Those queries may semantically result in point-in-time "events"— one per matching log line. In some embodiments, in the time series display, these point-in-time events are displayed as lines intersecting on the time axis with the timestamp of the log message. In this example, on hover, the log message itself or a string synthesized as part of the query is displayed, for example to indicate that "Version 201.44 deployed"— this will then tell the user that at that point in time, a new software version was deployed, which might explain, potentially, certain changes in the behavior of the time series after this point in time. The label for each such event may also be displayed permanently, for example, as an attached "flag". When hovering or clicking on the flag, the system can then bring the user to the exact log that underlies the event, and show context, both before and after, in time. The optional drill-down operations described in the above paragraph are valid here as well.

A second example way to overlay information from logs in time series displays is to allow users to add one or multiple log queries to the metrics queries driving the display that are written in such a way that they return not point-in-time events, but interval events. Interval events have a start and an end time; semantically they represent that something is believed to have been true during the interval. For example, an interval event might represent the span of time a user was logged into a system. Log search engines typically have multiple ways of "session-izing" logs into such interval events. This is also often referred to as the ability to extract "transactions" from series of individual logs. The time series display may then, for example, use different colors to visually show the extent of each interval event in time. This may again help the user to visually correlate activity in the system derived from logs with time series activity. User input actions such as hovering or selecting an interval belonging to an event may then bring the user to the exact logs making up that interval. All other drill down options described above may also apply.

As another example, log message counts or the result of aggregation queries by time in the time series displays may also be overlaid, for example, in a manner such as a heatmap (e.g., as shown in the example interface of FIG. 15). Again, along with the metrics queries the user can specify a log query; in case of a non-aggregation query, the system, in some embodiments, automatically counts the number of results of the query based on an appropriate quantization in time (e.g., visually related to the time range displayed). The counts can then be overlaid in the manner of a heatmap in the time series display, where the selection of a slice of the heatmap brings forward the matching logs. Similarly it is possible to display the results of a counting aggregation query by time—in the end, the result that is produced is a count per time interval, except that, in some embodiments, the time interval and what is being counted or otherwise statistically computed is specified by the user and not implied by the system as in the non-aggregation case. It should be noted that the heatmap overlay visualization is but only one possible visualization. In the examples described herein, the results of the log queries are time series themselves, so they may also be displayed, if the user desires, in the same manner as metrics time series (e.g., line or area charts) from the metrics queries.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
 receive a log message;
 determine that the log message matches a log-to-metrics translation rule;
 in response to determining that the log message matches a log-to-metrics translation rule, translate, using the log-to-metrics translation rule, the log message into a metrics data point comprising a timestamp, a metric name, a metric value, and a set of metadata key-value pairs, the metadata key-value pairs comprising keys extracted from the log message and values associated with the keys in the log message;
 determine a time series from a plurality of time series, the determined time series having an identifier that comprises the set of metadata key-value pairs;
 insert the metrics data point into the determined time series;
 maintain a metadata catalog for the plurality of time series, the metadata catalog being indexed by metric name for the plurality of time series;
 receive a query for information on one time series from the plurality of time series;
 retrieve the information based on the metadata catalog; and
 present the retrieved information on a display; and
a memory coupled to the processor and configured to provide the processor with instructions.

2. The system of claim 1, wherein in response to determining that the log message matches the logs-to-metrics translation rule, the processor is further configured to extract, using one or more parse expressions, one or more fields from the log message.

3. The system of claim 2, wherein the processor is configured to translate the log message into the metrics data point at least in part by mapping a portion of the fields extracted from the log message to the metric name.

4. The system of claim 2, wherein the processor is configured to translate the log message into the metrics data point at least in part by mapping a portion of the fields extracted from the log message to one or more dimensions associated with the set of metadata key-value pairs.

5. The system of claim 1, wherein the identifier of the time series comprises a list of the metadata key-value pairs associated with the metrics data point.

6. The system of claim 1, wherein the processor is further configured to determine whether to drop the log message or to keep the log message.

7. The system of claim 6, wherein in response to determining that the log message should be kept, the processor is further configured to persist the log message.

8. The system of claim 7, wherein the processor is further configured to associate an identifier of the log message with the metrics data point into which the log message was translated.

9. A method, comprising:
 receiving a log message;
 determining that the log message matches a log-to-metrics translation rule;
 in response to determining that the log message matches a log-to-metrics translation rule, translating, using the log-to-metrics translation rule, the log message into a metrics data point comprising a timestamp, a metric name, a metric value, and a set of metadata key-value pairs, the metadata key-value pairs comprising keys extracted from the log message and values associated with the keys in the log message;
 determining a time series from a plurality of time series, the determined time series having an identifier that comprises the set of metadata key-value pairs;
 inserting the metrics data point into the determined time series;
 maintaining a metadata catalog for the plurality of time series, the metadata catalog being indexed by metric name for the plurality of time series;
 receiving a query for information on one time series from the plurality of time series;
 retrieving the information based on the metadata catalog; and
 presenting the retrieved information on a display.

10. The method of claim 9, comprising, in response to determining that the log message matches the logs-to-metrics translation rule, extracting, using one or more parse expressions, one or more fields from the log message.

11. The method of claim 10, comprising translating the log message into the metrics data point at least in part by mapping a portion of the fields extracted from the log message to the metric name.

12. The method of claim 10 comprising translating the log message into the metrics data point at least in part by mapping a portion of the fields extracted from the log message to one or more dimensions associated with the set of metadata key-value pairs.

13. The method of claim 9, wherein the identifier of the time series comprises a list of the metadata key-value pairs associated with the metrics data point.

14. The method of claim 9, further comprising determining whether to drop the log message or to keep the log message.

15. The method of claim 14, further comprising, in response to determining that the log message should be kept, persisting the log message.

16. The method of claim 15, further comprising associating an identifier of the log message with the metrics data point into which the log message was translated.

17. A computer program product embodied in a non-transitory tangible computer readable storage medium and comprising computer instructions for:

receiving a log message;

determining that the log message matches a log-to-metrics translation rule;

in response to determining that the log message matches a log-to-metrics translation rule, translating, using the log-to-metrics translation rule, the log message into a metrics data point comprising a timestamp, a metric name, a metric value, and a set of metadata key-value pairs, the metadata key-value pairs comprising keys extracted from the log message and values associated with the keys in the log message;

determining a time series from a plurality of time series, the determined time series having an identifier that comprises the set of metadata key-value pairs;

inserting the metrics data point into the determined time series;

maintaining a metadata catalog for the plurality of time series, the metadata catalog being indexed by metric name for the plurality of time series;

receiving a query for information on one time series from the plurality of time series;

retrieving the information based on the metadata catalog; and presenting the retrieved information on a display.

18. The computer program product embodied in a non-transitory tangible computer readable storage medium of claim 17, wherein the identifier of the time series comprises a list of the metadata key-value pairs associated with the metrics data point.

* * * * *